(12) United States Patent
Fukuda et al.

(10) Patent No.: US 11,847,198 B2
(45) Date of Patent: Dec. 19, 2023

(54) INFORMATION PROCESSING APPARATUS, INFORMATION PROCESSING METHOD, AND STORAGE MEDIUM

(71) Applicant: NEC Corporation, Tokyo (JP)

(72) Inventors: Junichi Fukuda, Tokyo (JP); Ryosuke Nakamura, Tokyo (JP); Yasushi Hamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 249 days.

(21) Appl. No.: 17/416,844

(22) PCT Filed: Dec. 24, 2019

(86) PCT No.: PCT/JP2019/050707
§ 371 (c)(1),
(2) Date: Jun. 21, 2021

(87) PCT Pub. No.: WO2020/138119
PCT Pub. Date: Jul. 2, 2020

(65) Prior Publication Data
US 2022/0083764 A1 Mar. 17, 2022

(30) Foreign Application Priority Data
Dec. 27, 2018 (JP) .................... 2018-244593

(51) Int. Cl.
*G06F 21/32* (2013.01)
*G06T 7/30* (2017.01)
(Continued)

(52) U.S. Cl.
CPC .............. *G06F 21/32* (2013.01); *G06F 18/22* (2023.01); *G06T 7/30* (2017.01); *G06T 7/70* (2017.01);
(Continued)

(58) Field of Classification Search
None
See application file for complete search history.

(56) References Cited

U.S. PATENT DOCUMENTS

| 2003/0123713 A1* | 7/2003 | Geng .................. G06F 18/28 348/47 |
| 2006/0007501 A1* | 1/2006 | Kawada ................ H04N 5/93 386/E5.028 |

(Continued)

FOREIGN PATENT DOCUMENTS

| JP | 2004185386 A | 7/2004 |
| JP | 2004295813 A | 10/2004 |

(Continued)

OTHER PUBLICATIONS

JP Office Action for JP Application No. 2020-563326, dated Aug. 4, 2022 with English Translation.

(Continued)

*Primary Examiner* — Delomia L Gilliard
(74) *Attorney, Agent, or Firm* — Sughrue Mion, PLLC

(57) ABSTRACT

An information processing apparatus includes: an acquisition unit that acquires a two-dimensional image of a person, and a registered image group including two-dimensional registered images and three-dimensional registered images of a plurality of registrants; and a selection unit that selects a type of a registered image to be used for matching from one of the two-dimensional registered images and the three-dimensional registered images based on the two-dimensional image, prior to the matching the two-dimensional image with the registered image group.

10 Claims, 28 Drawing Sheets

(51) Int. Cl.
- *G06T 7/70* (2017.01)
- *G06V 40/16* (2022.01)
- *G06V 20/52* (2022.01)
- *G06T 11/00* (2006.01)
- *G06F 18/22* (2023.01)
- *G06V 10/24* (2022.01)
- *G06V 20/64* (2022.01)

(52) U.S. Cl.
CPC ............ *G06T 11/00* (2013.01); *G06V 10/242* (2022.01); *G06V 20/52* (2022.01); *G06V 20/647* (2022.01); *G06V 40/161* (2022.01); *G06V 40/172* (2022.01); *G06V 40/174* (2022.01); *G06T 2200/04* (2013.01); *G06T 2207/30201* (2013.01); *G06T 2207/30232* (2013.01)

(56) References Cited

U.S. PATENT DOCUMENTS

| | | | |
|---|---|---|---|
| 2007/0050639 A1 | 3/2007 | Nakano et al. | |
| 2007/0100223 A1 | 5/2007 | Liao et al. | |
| 2007/0229499 A1 | 10/2007 | Aoyama et al. | |
| 2011/0026782 A1* | 2/2011 | Ego | G06F 18/285 |
| | | | 382/118 |
| 2016/0070952 A1 | 3/2016 | Kim et al. | |

FOREIGN PATENT DOCUMENTS

| | | |
|---|---|---|
| JP | 2007058393 A | 3/2007 |
| JP | 2007265162 | 10/2007 |
| JP | 2011203791 A | 10/2011 |
| JP | 2013250856 A | 12/2013 |
| JP | 2014146080 A | 8/2014 |

OTHER PUBLICATIONS

Extended European Search Report for EP Application No. EP19901633.8 dated Jan. 7, 2022.

International Search Report for PCT Application No. PCT/JP2019/050707, dated Mar. 17, 2020.

English translation of Written opinion for PCT Application No. PCT/JP2019/050707, dated Mar. 17, 2020.

Nakanowatari Akihiro et al., "Face recognition that is robust against pose and illumination changes", Panasonic Technical Journal, Jan. 15, 2009, p. 24-29, vol. 54, No. 4, Panasonic Corporation, Japan.

* cited by examiner

Registrant information

| Registrant ID | Name | Address | 2D face image | 3D face image | ... |
|---|---|---|---|---|---|
| 00101 | [ Name NM1 ] | [ Address A1 ] |  |  | ... |
| 00102 | [ Name NM2 ] | [ Address A2 ] |  |  | ... |
| 00103 | [ Name NM3 ] | [ Address A3 ] |  |  | ... |
| ... | ... | ... | ... | ... | ... |

| | CANDIDATE DISPLAY WINDOW | | | |
|---|---|---|---|---|

Matching target

Capturing time : 2018/12/15 18:05
Capturing place : ********

Extraction condition : Gender = male
Sort condition : Similarity degree

| Candidate | Rank | Similarity degree | Age | Address |
|---|---|---|---|---|
|  | 1 | 9168 | 35 | [ Address A2 ] |
|  | 2 | 7226 | 38 | [ Address A5 ] |
|  | 3 | 6353 | 32 | [ Address A6 ] |

TWO-DIMENSIONAL IMAGE

THREE-DIMENSIONAL REGISTERED IMAGE

HORIZONTALLY COMPOSED IMAGE

VERTICALLY COMPOSED IMAGE

TWO-DIMENSIONAL IMAGE

IMG_21

THREE-DIMENSIONAL EDITED IMAGE

IMG_22

HORIZONTALLY COMPOSED IMAGE

VERTICALLY COMPOSED IMAGE

TWO-DIMENSIONAL IMAGE

IMG_31

THREE-DIMENSIONAL REGISTERED IMAGE

IMG_32

HORIZONTALLY COMPOSED IMAGE

VERTICALLY COMPOSED IMAGE

TWO-DIMENSIONAL IMAGE

THREE-DIMENSIONAL EDITED IMAGE

HORIZONTALLY COMPOSED IMAGE

VERTICALLY COMPOSED IMAGE

TWO-DIMENSIONAL IMAGE

THREE-DIMENSIONAL REGISTERED IMAGE

HORIZONTALLY COMPOSED IMAGE

VERTICALLY COMPOSED IMAGE

TWO-DIMENSIONAL IMAGE

IMG_61

THREE-DIMENSIONAL EDITED IMAGE

IMG_62

HORIZONTALLY COMPOSED IMAGE

VERTICALLY COMPOSED IMAGE

TWO-DIMENSIONAL IMAGE

THREE-DIMENSIONAL REGISTERED IMAGE

HORIZONTALLY COMPOSED IMAGE

VERTICALLY COMPOSED IMAGE

TWO-DIMENSIONAL IMAGE

THREE-DIMENSIONAL EDITED IMAGE

HORIZONTALLY COMPOSED IMAGE

VERTICALLY COMPOSED IMAGE

INFORMATION PROCESSING APPARATUS, INFORMATION PROCESSING METHOD, AND STORAGE MEDIUM

This application is a National Stage Entry of PCT/JP2019/050707 filed on Dec. 24, 2019, which claims priority from Japanese Patent Application 2018-244593 filed on Dec. 27, 2018, the contents of all of which are incorporated herein by reference, in their entirety.

TECHNICAL FIELD

This disclosure relates to an information processing apparatus, an information processing method, and a storage medium.

BACKGROUND ART

In recent years, an apparatus that identifies a person by matching an image of the person captured by a security camera or the like with an image of a registrant registered in a database in advance is widely used due to development of image recognition techniques. In the nature of operation, however, there is a case where a user has to visually check a matching result.

Patent Literature 1 discloses a 2D/3D composite matching apparatus which generates a 3D matching face image from a stereo image obtained by photographing an object of matching from two directions and switches a matching mode to a 2D matching mode or a 3D matching mode based on whether or not the 3D matching face image faces the front.

CITATION LIST

Patent Literature

PTL 1: Japanese Patent Application Laid-Open No. 2011-203791

SUMMARY OF INVENTION

Technical Problem

The apparatus disclosed in Patent Literature 1 improves the accuracy of matching process by selecting an appropriate matching mode based on the orientation of a 3D matching face image. However, since the apparatus is configured to generate a 3D matching face image from the stereo image of the matching object to be used for determining the matching mode, it takes time from the time when the matching object is photographed until the matching processing is completed.

Accordingly, this disclosure has been made in view of the above problem and intends to provide an information processing apparatus, an information processing method, and a storage medium that can increase the speed of the matching process for person images.

Solution to Problem

According to one example aspect of this disclosure, provided is an information processing apparatus including: an acquisition unit that acquires a two-dimensional image of a person, and a registered image group including two-dimensional registered images and three-dimensional registered images of a plurality of registrants; and a selection unit that selects a type of a registered image to be used for matching from one of the two-dimensional registered images and the three-dimensional registered images based on the two-dimensional image, prior to the matching the two-dimensional image with the registered image group.

According to another example aspect of this disclosure, provided is an information processing method including: acquiring a two-dimensional image of a person, and a registered image group including two-dimensional registered images and three-dimensional registered images of a plurality of registrants; and selecting a type of a registered image to be used for matching from one of the two-dimensional registered images and the three-dimensional registered images based on the two-dimensional image, prior to the matching the two-dimensional image with the registered image group.

According to yet another example aspect of this disclosure, provided is a storage medium storing a program that causes a computer to perform: acquiring a two-dimensional image of a person, and a registered image group including two-dimensional registered images and three-dimensional registered images of a plurality of registrants; and selecting a type of a registered image to be used for matching from one of the two-dimensional registered images and the three-dimensional registered images based on the two-dimensional image, prior to the matching the two-dimensional image with the registered image group.

According to this disclosure, an information processing apparatus, an information processing method, and a program that can increase the speed of the matching process for person images.

DESCRIPTION OF EMBODIMENTS

Figure 1:
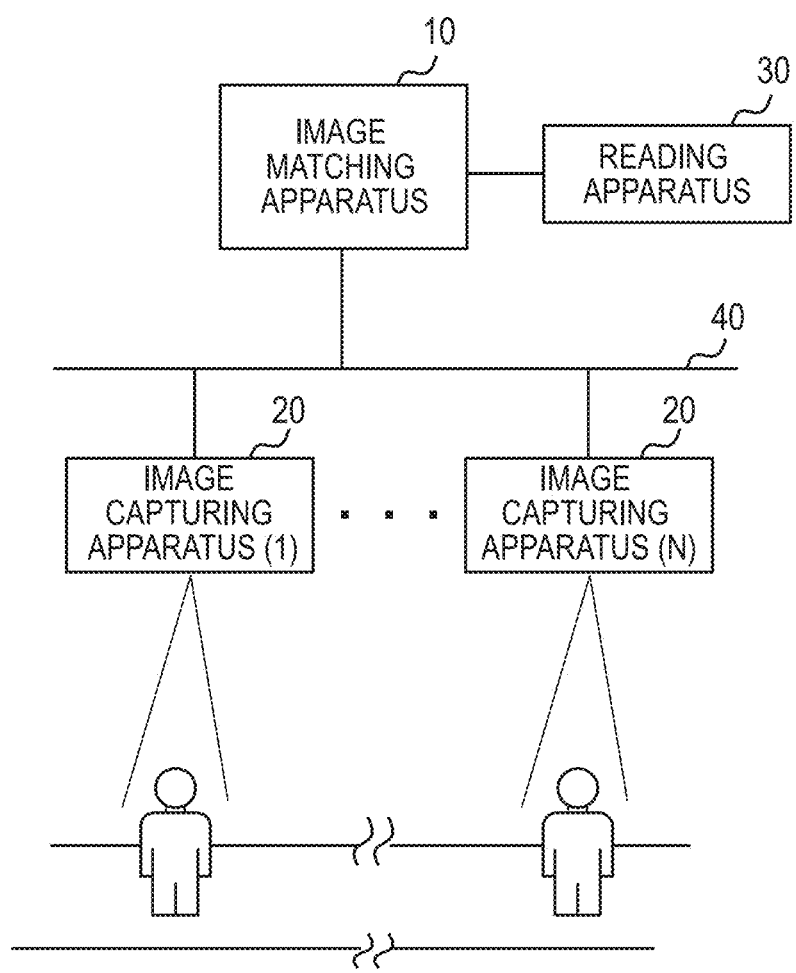
FIG. 1 is a diagram illustrating the entire configuration example of an information matching system in a first example embodiment.

Illustrative example embodiments of this disclosure will be described below with reference to the drawings. In the drawings, the same elements or corresponding elements are labeled with the same reference, and the description thereof may be omitted or simplified.

First Example Embodiment

First, the configuration of an image matching system 1 in the present example embodiment will be described with reference to FIG. 1 to FIG. 5. FIG. 1 is a diagram illustrating the entire configuration example of the image matching system 1 in the present example embodiment. The image matching system 1 is an information processing system that has an image matching apparatus 10, an image capturing apparatus 20, and a reading apparatus 30. Each apparatus is connected to a network 40 such as a Local Area Network (LAN), the Internet, or the like.

The image matching apparatus 10 is an information processing apparatus that, in an event site, a theme park, a traffic facility and a public institution, or the like, for example, matches biometrics information obtained by an image of a matching target person (hereafter, referred to as "matching target") with a biometrics information group of a plurality of registrants that is registered in a database in advance. The biometrics information may be a face image, a fingerprint image, an iris image, a finger vein image, a palm print image, a palm vein image, or the like.

Note that the term "biometrics information" in the present example embodiment means a face image and a feature amount extracted from the face image. Further, a plurality of face images of registrants are obtained for each registrant by capturing a face of a person not only from the front but also at a plurality of capturing angles when membership registration is performed, for example. A feature amount extracted from a face image may be an amount indicating a feature of a face such as a position of a characteristic part such as a pupil, a nose, a mouth end, for example.

The image capturing apparatus 20 is a network camera such as a security camera installed in the facility to be managed. The image capturing apparatus 20 outputs a capturing image obtained by capturing a predetermined region of a facility to the image matching apparatus 10, for example. Note that, while the image capturing apparatus 20 is connected to the image matching apparatus 10 via the network 40 by wire in FIG. 1, the example embodiment is not limited thereto. The image capturing apparatus 20 may be connected to the image matching apparatus 10 wirelessly. Thus, the image capturing apparatus 20 may be a user terminal such as a smartphone, a tablet terminal, a personal computer, or the like.

The reading apparatus 30 is a scanner apparatus that optically reads a print such as a photograph or an apparatus that reads data stored in an electronic storage medium such as an IC card, a USB memory, and a disc. The reading apparatus 30 outputs the read image data to the image matching apparatus 10.

Figure 2:
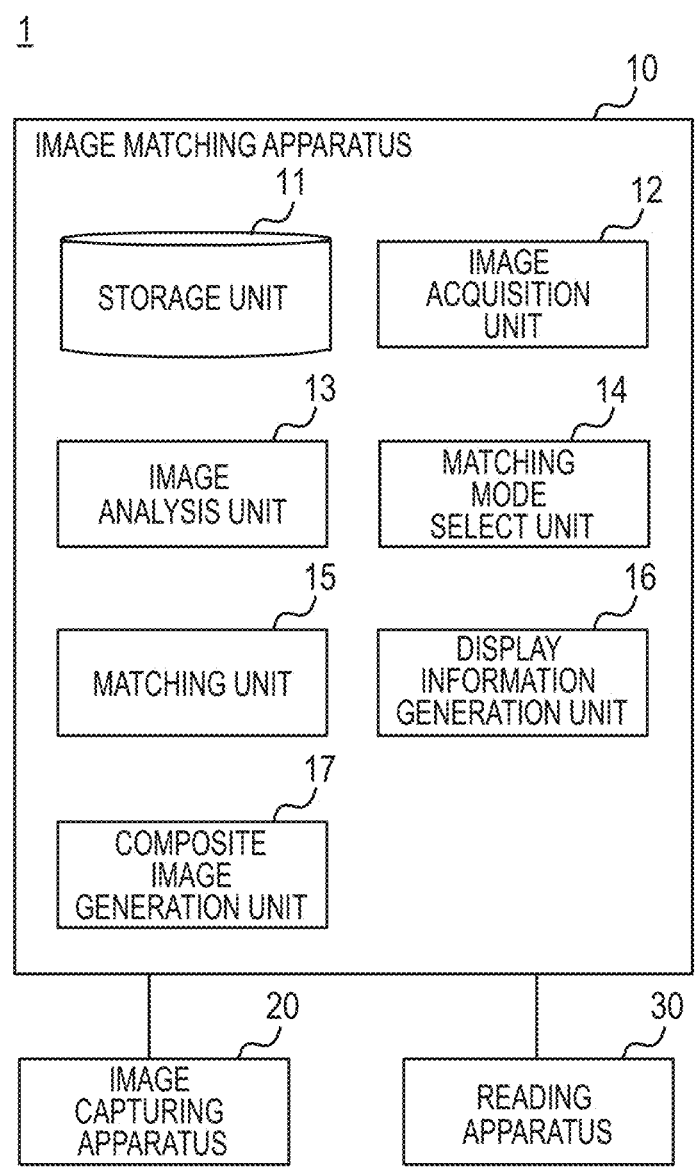
FIG. 2 is a block diagram illustrating the function of an image matching apparatus in the first example embodiment.

FIG. 2 is a function block diagram of the image matching apparatus 10 in the present example embodiment. The image matching apparatus 10 has a storage unit 11, an image acquisition unit 12, an image analysis unit 13, a matching mode select unit 14, a matching unit 15, a display information generation unit 16, and a composite image generation unit 17.

Figure 3:
FIG. 3 is a diagram illustrating one example of registrant information stored in a storage unit in the first example embodiment.
Figure 3:
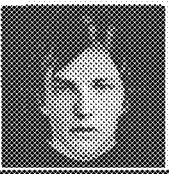
Figure 3:
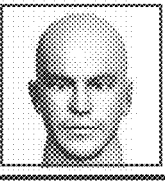
Figure 3:
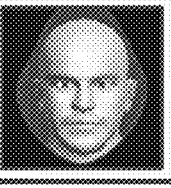
Figure 3:
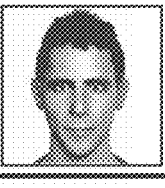
Figure 3:
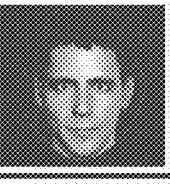

The storage unit 11 stores a two-dimensional face image and three-dimensional images of a plurality of registrants as registrant information. The registrant information may be a black list, a white list, a VIP list, an employee list, or the like. FIG. 3 is a diagram illustrating one example of registrant information stored in a storage unit 11 in the present example embodiment. Herein, an example of a data item of the registrant information may be a registrant ID, a name, an address, a two-dimensional image (2D face image), and a three-dimensional image (3D face image). The data item of the registrant information is not limited to the item illustrated in FIG. 3 and may further include attribute information of a registrant such as a face feature amount extracted from a face image, the age, the body height, a body type (slender type/normal type/obesity type), a birthplace, a body characteristic such as the presence or absence of a mole or a scar, a career, and an academic background of the registrant. Furthermore, the data item of the registrant information may further include attribute information of a file, such as an image registration date.

Furthermore, in FIG. 3, while a face image facing the front is illustrated as an example as a two-dimensional image (2D face image), a face orientation of a two-dimensional image stored in the storage unit 11 is not limited to only the front. For example, a face orientation may be a two-dimensional image when viewed from the left or right side or a two-dimensional image when viewed from an oblique direction (for example, 45 degrees). Furthermore, a plurality of two-dimensional images corresponding to a plurality of face orientations may be stored. A plurality of two-dimensional images may be created from a three-dimensional image or may be created together in a process of creating a three-dimensional image. When the storage unit 11 stores a two-dimensional image obtained by capturing the front, the right side, or the left side of a face, for example, a face image when facing diagonally forward, which corresponds to a capturing condition between the front and the right side, may be supplemented with a 3D model (three-dimensional image).

The image acquisition unit 12 acquires a two-dimensional image of a matching target from the image capturing apparatus 20 or the reading apparatus 30. Furthermore, the image acquisition unit 12 acquires a two-dimensional registered image and three-dimensional registered images of a plurality of registrants from the storage unit 11 in response to a request from the display information generation unit 16 or the composite image generation unit 17.

The image analysis unit 13 analyzes a two-dimensional image acquired in the image acquisition unit 12 and detects the face image corresponding to a face region of a matching target. Furthermore, the image analysis unit 13 detects the face orientation of a matching target based on the distance and the positional relationship or the like between feature positions (eyes, a nose, a mouth, or the like) in a face image. The face orientation may be calculated based on a state where a matching target faces the front as a reference, for example.

The matching mode select unit 14 selects a type of a registered image used for matching from one of a two-dimensional registered image and a three-dimensional registered image based on a two-dimensional image, prior to matching a two-dimensional image with a registered image group.

In the present example embodiment, a matching mode for matching a two-dimensional image with a two-dimensional registered image is referred to as "2D matching mode" and a matching mode for matching a two-dimensional image with a three-dimensional registered image is referred to as "3D matching mode". The 2D matching mode has a high processing speed and can realize a real-time property. On the contrary, a matching accuracy decreases when a face orientation is not the same as the orientation in a face photograph listed on the registrant list (for example, the front). Furthermore, even when a face orientation is the same as the orientation in a face photograph, when conditions other than a face orientation (for example, a light and shade distribution in an image, the area of a recognizable part, or the like) are significantly different, normal matching may not be performed. In contrast, in the 3D matching mode, it is possible to perform matching by flexibly addressing a change in conditions such as the orientation of a face, a lighting condition, and the presence or absence of an attachment (a worn item). On the contrary, the 3D matching mode has more variations of the face orientation or the like than a two-dimensional image, and there is a concern of a reduction in the processing speed and the processing capacity.

Accordingly, the matching mode select unit 14 determines an image suitable for matching out of a two-dimensional and a three-dimensional registered image in accordance with the degree to which a face can be recognized in the two-dimensional image and selects a matching mode. Note that the degree to which a face can be recognized may be determined by the face orientation of a person, the light and shade distribution in an image, the type of a recognizable part, the recognizable area, the presence or absence of an attachment (an accessory), or the like. In the present example embodiment, the degree is determined by the face orientation of a person.

The matching mode select unit 14 in the present example embodiment selects a type of a registered image based on the face orientation of a matching target calculated in the image analysis unit 13. For example, the matching mode select unit 14 selects a two-dimensional registered image when the angle of the face orientation of a matching target in a two-dimensional image relative to a reference orientation is within a predetermined threshold and selects a three-dimensional registered image when the angle exceeds the threshold. The threshold of the angle in the present example embodiment is 30 degrees in the vertical direction and the horizontal direction (15 degrees each in the upward direction, the downward direction, the left direction, and the right direction), and the reference orientation corresponds to the front direction.

Figure 4A:
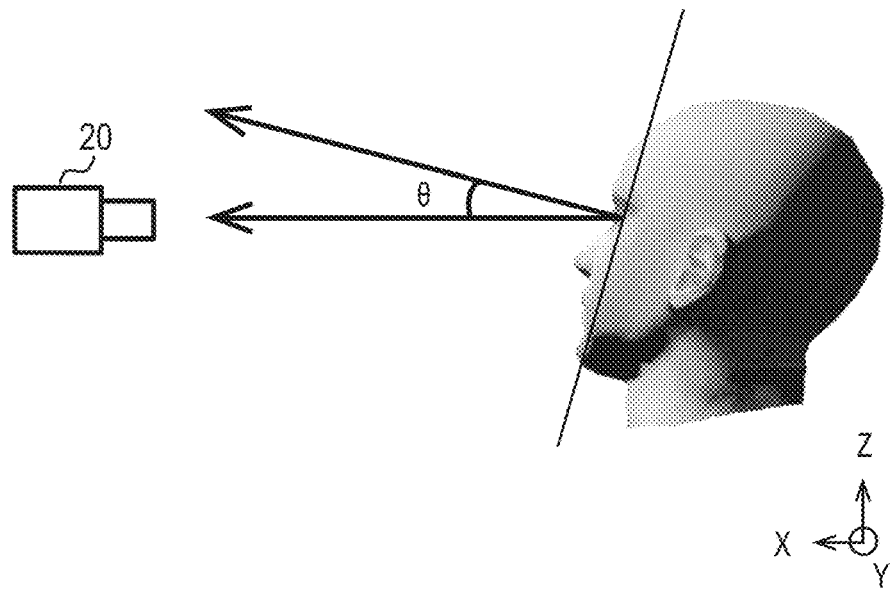
FIG. 4A is a diagram illustrating a positional relationship between face orientation of a matching target and an image capturing apparatus in the first example embodiment.
Figure 4B:
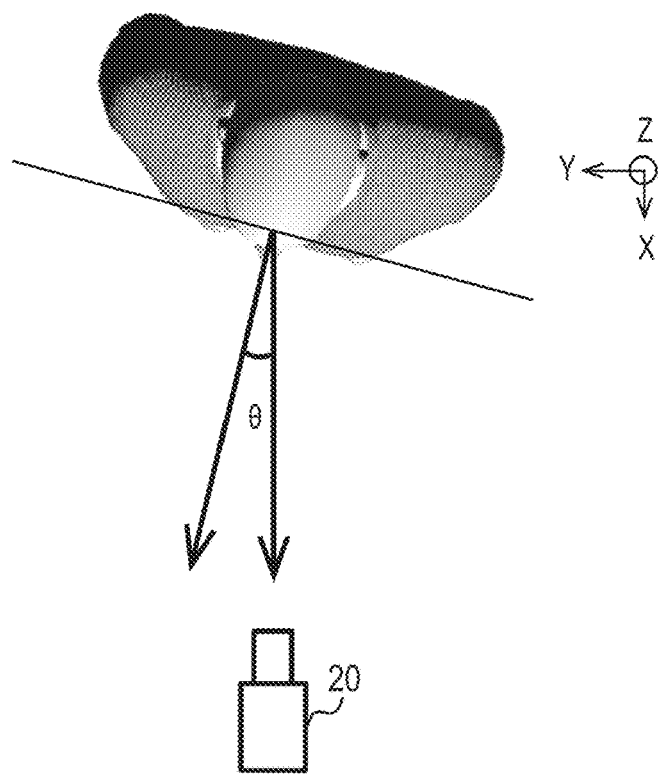
FIG. 4B is a diagram illustrating a positional relationship between face orientation of a matching target and an image capturing apparatus in the first example embodiment.

FIG. 4A and FIG. 4B are diagrams illustrating a positional relationship between a face orientation of a matching target and the image capturing apparatus 20 in the present example embodiment. In this example, the horizontal direction is represented by an X-axis and a Y-axis orthogonal to each other, and the perpendicular direction is represented by a Z-axis orthogonal to both the X-axis and the Y-axis. Further, the capturing direction of the image capturing apparatus 20 matches the axial direction of the X-axis.

FIG. 4A illustrates a state of a head part of a matching target when viewed from the side. Here, with reference to a state where the matching target looks at the image capturing apparatus 20 from the front, the face orientation of the matching target is inclined by an angle θ in the perpendicularly upward direction (the Z-axis positive direction in FIG. 4A). In contrast, FIG. 4B illustrates a state of the head part of the matching target when viewed from the overhead side. Here, with reference to a state where the matching target looks at the image capturing apparatus 20 from the front, the face orientation of the matching target is inclined by an angle θ in the left direction (the Y-axis negative direction in FIG. 4B).

A matching mode select unit 14 of the present example embodiment uses a two-dimensional registered image for matching when the angle θ of the face orientation of the matching target relative to the front direction is within a threshold (15 degrees) in both FIG. 4A and FIG. 4B. The matching mode select unit 14 then uses a three-dimensional registered image for matching when the angle θ exceeds the threshold in either one of FIG. 4A and FIG. 4B. The same applies to a case where the face orientation of the matching target is the perpendicularly downward direction and a right direction.

The matching unit 15 matches a two-dimensional image of a matching target with a registered image group including three-dimensional registered images of a plurality of registrants or a registered image group including two-dimensional registered images of a plurality of registrants based on a matching mode selected by the matching mode select unit 14 and calculates a similarity degree between the matching target and registrants on a registrant basis.

The matching unit 15 matches a two-dimensional image with a two-dimensional registered image when the matching mode is a 2D mode. Further, the matching unit 15 matches a two-dimensional image with a three-dimensional registered image when the matching mode is a 3D mode. In such a case, the matching unit 15 first adjusts the face orientation of the registrant in the three-dimensional registered image to be consistent with the face orientation of a person in the two-dimensional image. Next, the matching unit 15 creates a two-dimensional projection image of the front from the three-dimensional registered image in which the face orientation has been adjusted. The matching unit 15 then matches the projection image with the two-dimensional image.

The display information generation unit 16 extracts a plurality of candidates from a plurality of registrants based on the similarity degree obtained by matching of a two-dimensional image of a matching target with a registered image group including three-dimensional registered images of a plurality of registrants and generates display information used for displaying the extracted candidates in order in accordance with the similarity degree. The display information generation unit 16 displays a candidate display window based on the generated display information on a display.

The composite image generation unit 17 superimposes, on a two-dimensional image of a matching target, a three-dimensional registered image of a person selected from a plurality of candidates by a user operation on the candidate display window and thereby generates a composite image. The composite image generation unit 17 displays a person check window including the generated composite image on the display.

Figure 5:
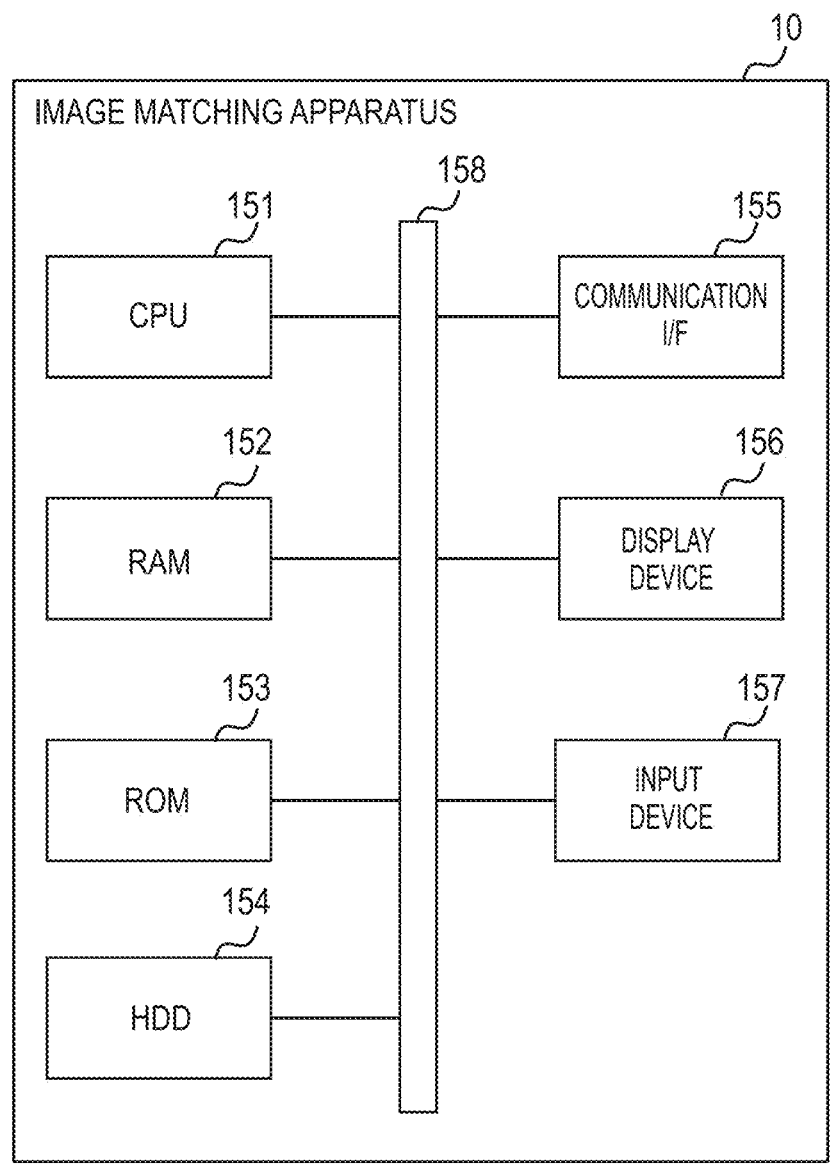
FIG. 5 is a block diagram illustrating a hardware configuration example of the image matching apparatus in the first example embodiment.

FIG. 5 is a block diagram illustrating a hardware configuration example of the image matching apparatus 10 in the present example embodiment. The image matching apparatus 10 has a central processing unit (CPU) 151, a random access memory (RAM) 152, a read only memory (ROM) 153, and a hard disk drive (HDD) 154 as a computer that performs operation, control, and storage. Further, the image matching apparatus 10 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

The CPU 151 is a processor having a function of performing a predetermined operation in accordance with a program stored in the ROM 153, the HDD 154, or the like and controlling each component of the image matching apparatus 10. The RAM 152 is formed of a volatile storage medium and provides a temporal memory area necessary for the operation of the CPU 151. The ROM 153 is formed of nonvolatile storage medium and stores necessary information such as a program used for the operation of the image matching apparatus 10. The HDD 154 is a storage device that is formed of a nonvolatile storage medium and stores data necessary for processing, an operation program of the image matching apparatus 10, or the like.

The communication I/F 155 is a communication interface based on the specification such as Ethernet (registered trademark), Wi-Fi (registered trademark), 4G, or the like, which is a module used for communicating with other apparatuses. The display device 156 is a liquid crystal display, an OLED display, or the like and is used for displaying an image, a text, an interface, or the like. The input device 157 is a keyboard, a pointing device, or the like and is used by the user for operating the image matching apparatus 10. An example of the pointing device may be a mouse, a trackball, a touchscreen, a pen tablet, or the like. The display device 156 and the input device 157 may be integrally formed as a touchscreen.

The CPU 151 loads a program stored in the ROM 153, the HDD 154, or the like to the RAM 152 and executes the program. Thereby, the CPU 151 implements the functions of the image acquisition unit 12, the image analysis unit 13, the matching mode select unit 14, the matching unit 15, the display information generation unit 16, the composite image generation unit 17, or the like described above. Furthermore, the CPU 151 implements the function of the storage unit 11 by controlling the HDD 154.

Note that the hardware configuration illustrated in FIG. 5 is an example, and a device other than the above may be added, or some of the devices may not be provided. Further, some of the devices may be replaced with another device having the same function. Furthermore, a part of the function of the present example embodiment may be provided by another device via the network 40, the function of the present example embodiment may be implemented by being distributed in a plurality of devices. For example, the HDD 154 may be replaced with a solid state drive (SSD) with a semiconductor memory or may be replaced with a cloud storage.

Figure 6:
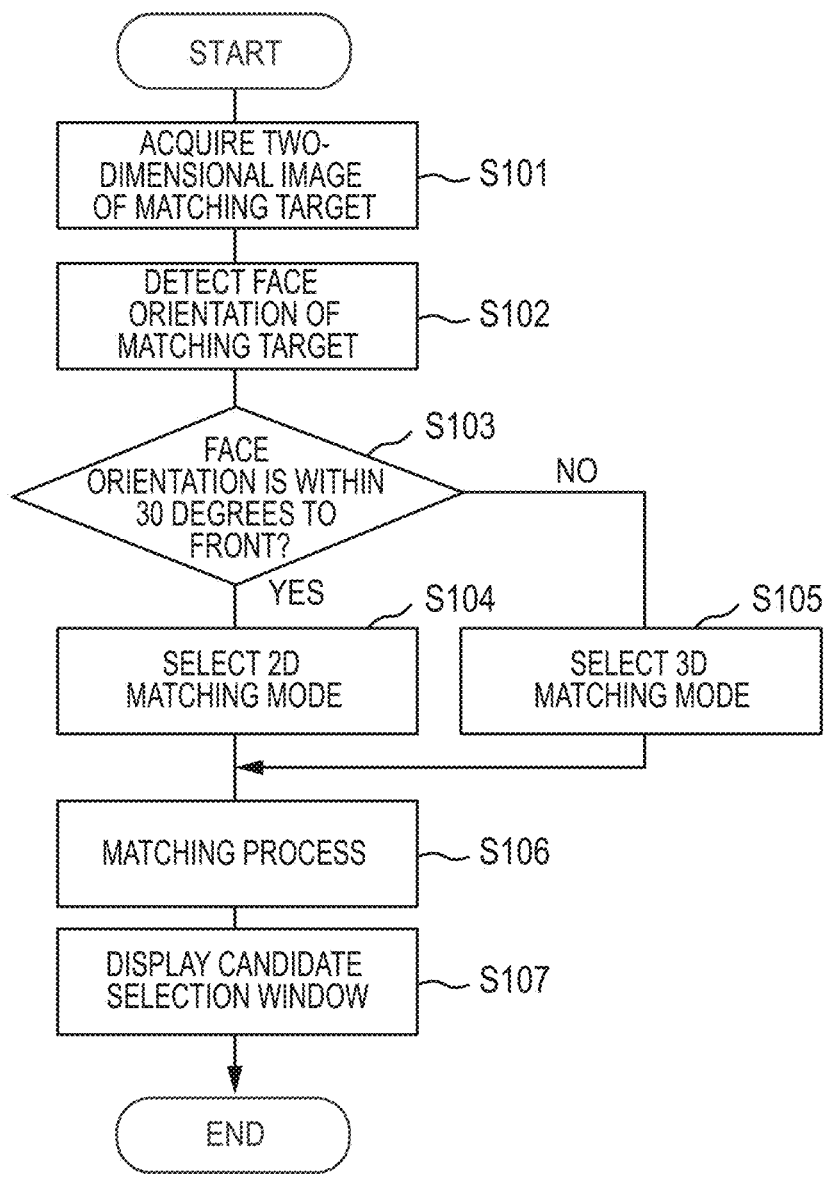
FIG. 6 is a flowchart illustrating one example of a matching process in the first example embodiment.

Next, the operation of the image matching apparatus 10 will be described with reference to FIG. 6 to FIG. 9. FIG. 6 is a flowchart illustrating an example of a matching process in the present example embodiment. For example, this process is repeatedly performed from an instruction to start performing a matching process by a user operation to an instruction to stop performing the matching process.

First, the CPU 151 (the image acquisition unit 12) of the image matching apparatus 10 acquires a two-dimensional image of a matching target from the image capturing apparatus 20 or the reading apparatus 30 (step S101). Next, the CPU 151 (the image analysis unit 13) analyzes the two-dimensional image to detect the face orientation of the matching target (step S102).

Next, the CPU 151 (the matching mode select unit 14) determines whether or not the detected face orientation is within 30 degrees (threshold) with respect to the front (step S103). In this step, if the CPU 151 (the matching mode select unit 14) determines that the face orientation is within 30 degrees with respect to the front (step S103: YES), the CPU 151 (the matching mode select unit 14) selects the 2D matching mode as a matching mode (step S104), and the process proceeds to step S106.

In contrast, if the CPU 151 (the matching mode select unit 14) determines that the face orientation is not within 30 degrees with respect to the front (step S103: NO), the CPU 151 (the matching mode select unit 14) selects the 3D matching mode as a matching mode (step S105), and the process proceeds to step S106.

In step S106, the CPU 151 (the matching unit 15) matches the two-dimensional image of the matching target with a registered image group of a plurality of registrants based on the matching mode selected by the matching mode select unit 14. Thereby, the CPU 151 (the matching unit 15) calculates a similarity degree between the matching target and registrants on a registrant basis.

The CPU 151 (the display information generation unit 16) then extracts a plurality of candidates from the plurality of registrants and generates display information used for displaying the extracted candidates in order in accordance with the similarity degree based on the similarity degree obtained by matching the two-dimensional image of the matching target with a registered image group and, in response, displays the display information as a candidate display window on the display device 156 (step S107).

Figure 7:
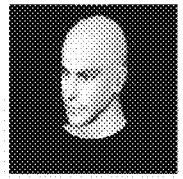
FIG. 7 is a diagram illustrating one example of a candidate display window in the first example embodiment.
Figure 7:
Figure 7:

FIG. 7 is a diagram illustrating an example of the candidate display window in the present example embodiment. The candidate display window in FIG. 7 displays a face image of a matching target, capturing time, a capturing place, an extraction condition, and a sort condition in the upper field. While the similarity degree is set as an initial setting, for example, the sort condition may be designated by a user operation from data items such as a gender or an address of a candidate.

Further, in a lower field, candidates extracted from a plurality of registrants by matching with the face image of the matching target are displayed in a form of a list in order of similarity degree. The display information on the list includes the rank of the similarity degree, the similarity degree, the age and the address of the candidate in addition to the face image (projection image) obtained by projection of three-dimensional registered image of the candidate. Further, the face orientation of a candidate in a face image has been corrected to be consistent with the face orientation of the matching target, which facilitates comparison of images of the matching target with a candidate.

Figure 8:
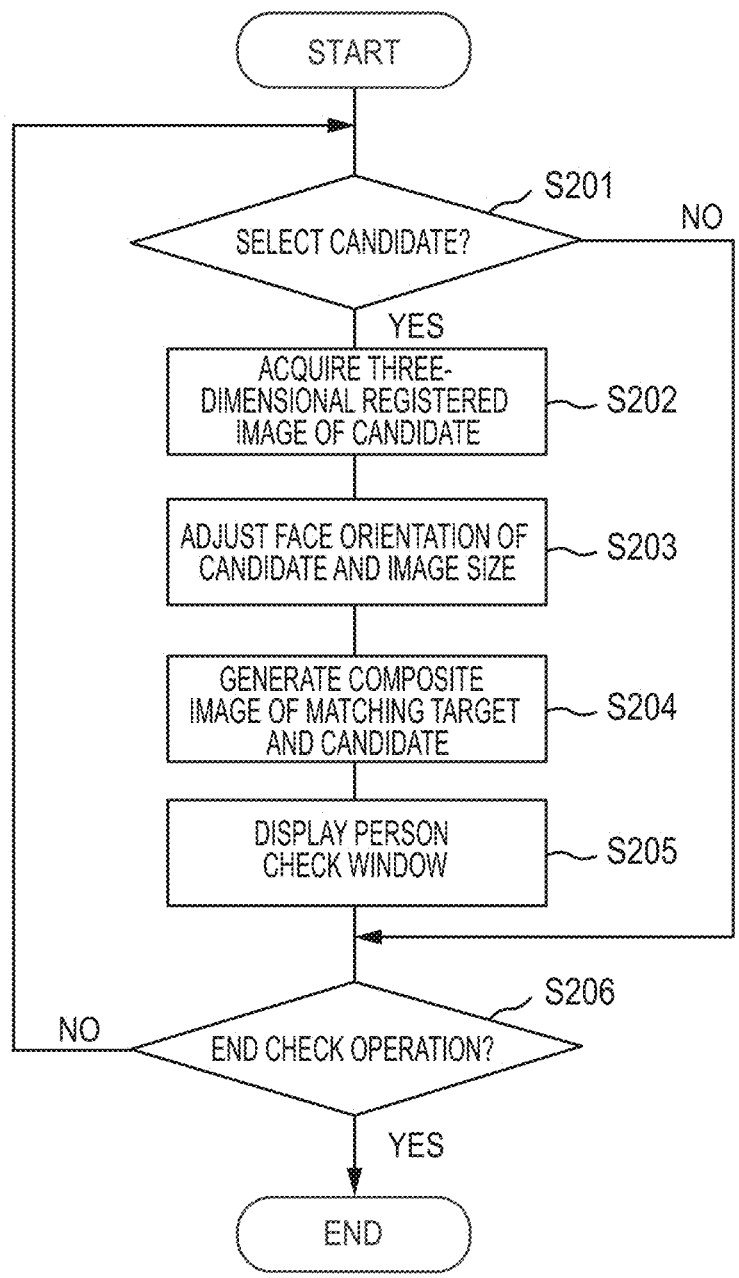
FIG. 8 is a flowchart illustrating one example of a generation process of a composite image in the first example embodiment.

FIG. 8 is a flowchart illustrating an example of a generation process of a composite image in the present example embodiment. This process is performed in association with the display process of the candidate display window in the display device 156.

First, the CPU 151 (the composite image generation unit 17) of the image matching apparatus 10 determines whether or not there is selection of a candidate by a user operation on the candidate display window (step S201). In this step, if the CPU 151 (the composite image generation unit 17) determines that there is selection of a candidate (step S201: YES), the process proceeds to step S202. In contrast, if the CPU 151 (the composite image generation unit 17) determines that there is no selection of a candidate (step S201: NO), the process proceeds to step S206.

In step S202, the CPU 151 (the composite image generation unit 17) acquires a three-dimensional registered image of the candidate from the HDD 154 (the storage unit 11) based on a registrant ID related to the candidate (step S202).

Next, the CPU 151 (the composite image generation unit 17) adjusts the face orientation and the size of the image of the candidate in the three-dimensional registered image to be consistent with the face orientation and the size of an image of a matching target in a two-dimensional image (step S203) and then generates a composite image of the matching target and the candidate (step S204).

Next, the CPU 151 (the composite image generation unit 17) displays, on the display device 156, a person check window including the composite image of the two-dimensional image of the matching target and the three-dimensional registered image of the candidate selected by a user operation (step S205).

Figure 9:
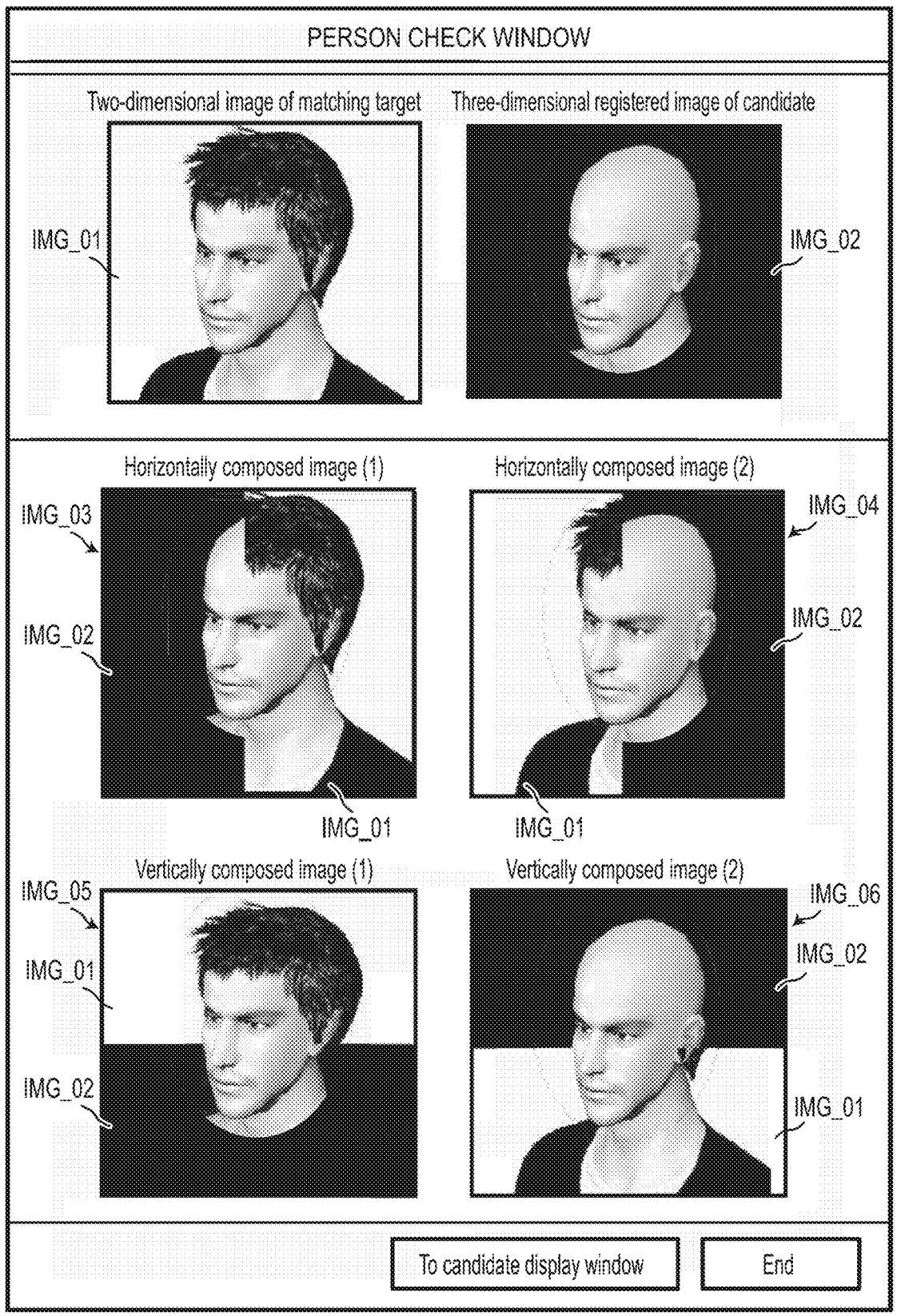
FIG. 9 is a diagram illustrating one example of a person check window in the first example embodiment.

FIG. 9 is a diagram illustrating an example of a person check window in the present example embodiment. In this example, in the upper field in the person check window, a two-dimensional image IMG_01 of a matching target and a three-dimensional registered image IMG_02 of a candidate selected from a list are juxtaposed and displayed. Further, in the lower field in the window, four types of composite images IMG_03 to IMG_06 generated from the two-dimensional image IMG_01 and the three-dimensional registered image IMG_02 of the upper field are arranged and displayed.

The composite images IMG_03 and IMG_04 are horizontal wipe images in which the two-dimensional image IMG_01 and the three-dimensional registered image IMG_02 are divided horizontally into two and combined, respectively. Similarly, the composite images IMG_05 and IMG_06 are vertical wipe images in which the two-dimensional image IMG_01 and the three-dimensional registered image IMG_02 are divided vertically into two and combined, respectively. When each composite image is generated, the three-dimensional registered image IMG_02 of the candidate has been adjusted to be consistent with the face orientation and the position coordinates of a face feature part (an eye, a nose, a mouth, or the like) within the image in the face image IMG_01 of the matching target.

Note that the type of composite images is not limited to only the vertical and horizontal wipe images. For example, the face image of any one of a matching target and a candidate may be converted into a semi-transparent image, and a composite image in which the semi-transparent image is superimposed on the other face image may be generated.

In step S206, the CPU 151 (the composite image generation unit 17) determines whether or not the end button of a check operation is pressed by a user operation on a check window (step S206). In this step, if the CPU 151 (the composite image generation unit 17) determines that the end button is pressed (step S206: YES), the process ends. In contrast, if the CPU 151 (the composite image generation unit 17) determines that the end button is not pressed (step S206: NO), the process returns to step S201, and the process of steps S201 to S206 is repeated until the end button is pressed.

As described above, the image matching apparatus 10 in the present example embodiment selects, from one of a two-dimensional registered image and a three-dimensional registered image, a type of a registered image used for matching based on an analysis result of a two-dimensional image prior to matching of the two-dimensional image (captured image) acquired from the image capturing apparatus 20 or the reading apparatus 30 with a registered image group. Thereby, the image matching apparatus 10 can perform a matching process in a matching mode suitable to matching of the two-dimensional image of the matching target. When the 2D matching mode is selected, a fast and accurate matching process is enabled.

On the other hand, when the 3D matching mode is selected because the face orientation of a matching target in the two-dimensional image exceeds a threshold, the face orientation of a candidate in the three-dimensional registered image is adjusted to be consistent with the face orientation of the matching target in the two-dimensional image. Thus, the image matching apparatus 10 can flexibly address two-dimensional images captured in various capturing angles to perform a matching process.

Further, the image matching apparatus 10 in the present example embodiment lists a plurality of registrants matched with a matching target in order of the similarity degree. Thereby, the user can proceed with a check operation while sequentially selecting candidates having a high similarity degree and thus can efficiently perform a visual check operation.

Further, the image matching apparatus 10 in the present example embodiment displays a check window including a composite image in which a face image of a matching target and a face image of a candidate selected from a list are composed. In the composite image, the face image of a candidate is corrected to cause the face orientation and the size thereof to be consistent with the face image of the matching target. This enables the user to easily check whether or not the matching target and the candidate are the same person by referencing the composite image.

Note that, while the image matching apparatus 10 in the present example embodiment is supposed to pre-store both the two-dimensional registered image and the three-dimensional registered image in a database (the storage unit 11) as registrant information, a configuration that stores only the three-dimensional registered image may be possible. In such a case, when the 2D matching mode is selected, two-dimensional matching image may be generated from the three-dimensional registered image and used in a matching process.

Further, while a case where the age and the address that are attribute information of a candidate are displayed in addition to a similarity degree has been described in the candidate display window illustrated in FIG. 7, displayed attribute information is not limited thereto. For example, attribute information such as the gender or the birthplace of a candidate may be displayed. Furthermore, the display information generation unit 16 may change the order of candidates in display information based on a data item selected by a user operation out of a plurality of data items included in attribute information.

Second Example Embodiment

The image matching system 1 in a second example embodiment will be described below. Note that a reference common to the reference provided in the drawings of the first example embodiment indicates the same component. The description of features common to the first example embodiment will be omitted, and different features will be described in detail.

The image matching system 1 in the present example embodiment is different from the first example embodiment in that the image matching apparatus 10 (the composite image generation unit 17) further has a function of performing an editing process for changing the appearance of a registrant on a three-dimensional registered image when superimposing a two-dimensional image of a certain person (a matching target) on a three-dimensional registered image of the registrant to generate a composite image.

Here, specific examples of an editing process for the appearance may be (A) to (F) or the like below.

(A) A process for adjusting a hair growth part, an amount, a shape (hairstyle or the like), a color of body hair (hair of head, beard, eyebrow, or the like).

(B) A process for adjusting the presence or absence of an attachment (glasses, a cap, a mask, a piercing jewelry, a tattoo, or the like).

(C) A process for simulating a change of the type or the extent of facial expression.

(D) A process for simulating a change of a body shape or the presence or absence of a scar.

(E) A process for simulating a change over the years of an aging degree of a face.

(F) A process for adjusting an influence degree of environmental light.

For (A) to (F) described above, in response to detecting a difference in the appearance between a two-dimensional image and a three-dimensional registered image, the composite image generation unit 17 of the present example embodiment performs an editing process for causing the appearance of one of the images to be closer to the appearance of the other image.

Figure 10:
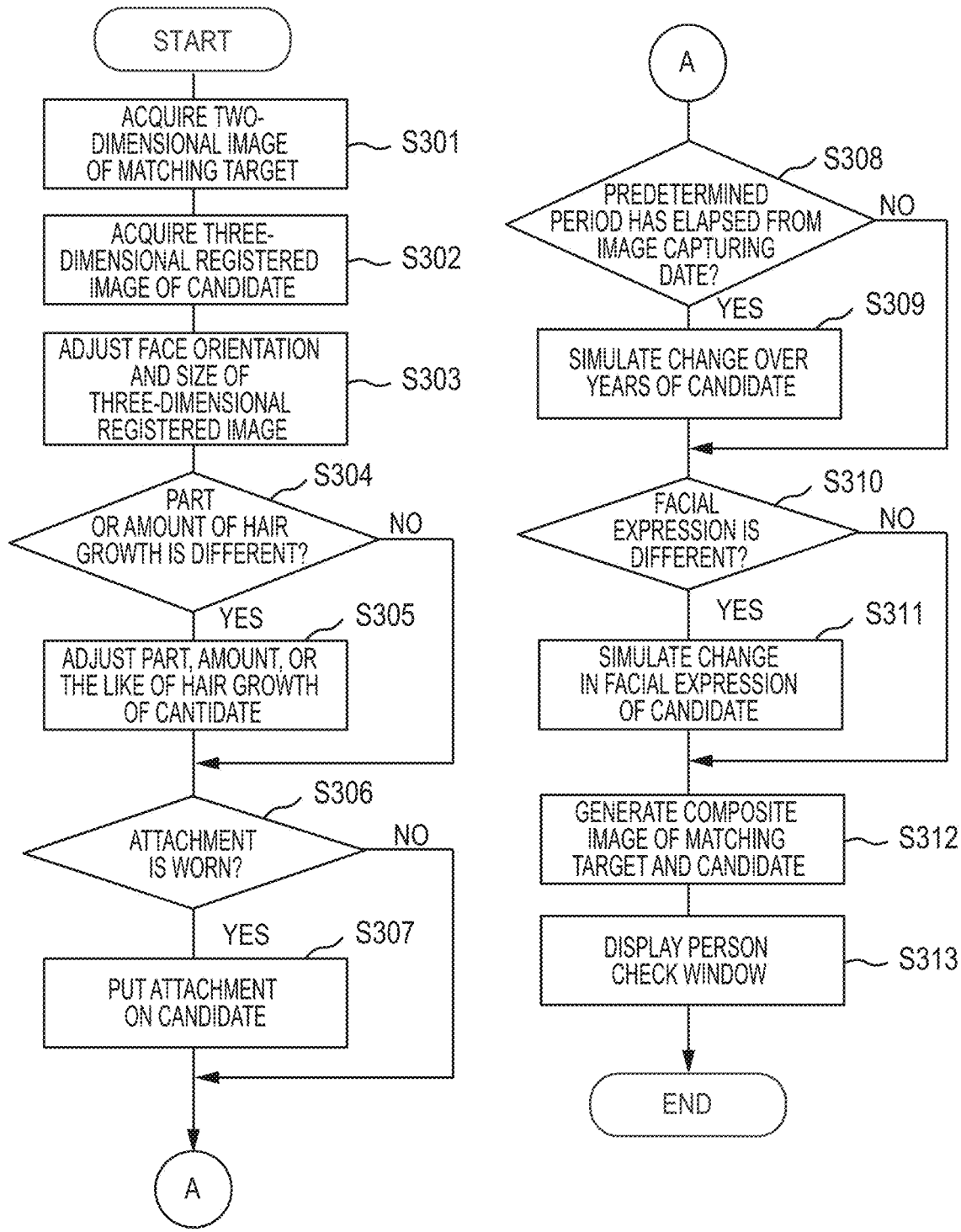
FIG. 10 is a flowchart illustrating one example of a generation process of a composite image in a second example embodiment.

FIG. 10 is a flowchart illustrating an example of a generation process of a composite image in the present example embodiment. For example, this process is performed when a candidate is selected based on a user operation on the candidate display window displayed when a matching process is performed as with the first example embodiment.

First, the CPU 151 (the composite image generation unit 17) acquires a two-dimensional image of a matching target (step S301). Next, the CPU 151 (the composite image generation unit 17) acquires a three-dimensional registered image of a candidate from the HDD 154 (the storage unit 11) based on a registrant ID related to the candidate (step S302).

Next, the CPU 151 (the composite image generation unit 17) adjusts the positional relationship of the face orientation and the feature portion of the candidate in the three-dimensional registered image to be consistent with the positional relationship between the face orientation and the feature portion of the matching target in the two-dimensional image (step S303).

Next, the CPU 151 (the composite image generation unit 17) compares the two-dimensional image with the three-dimensional registered image and determines whether or not a hair growth part (the head or the chin), a hair growth amount and shape, or the like is different between the two images beyond a predetermined tolerance range (step S304).

Here, if the CPU 151 (the composite image generation unit 17) determines that a hair growth part, a hair growth amount and shape, or the like is different beyond the predetermined tolerance range (step S304: YES), the CPU 151 (the composite image generation unit 17) then adjusts the hair growth part or the like of the candidate in the three-dimensional registered image to be consistent with the hair growth part or the like of the matching target in the two-dimensional image (step S305), and the process proceeds to step S306. The hair growth part or the hair growth amount and shape of the candidate in the three-dimensional registered image may be automatically selected from predetermined templates regarding hair growth parts.

In contrast, if the CPU 151 (the composite image generation unit 17) determines that a hair growth part or the like is not different beyond the predetermined tolerance range between the two-dimensional image and the three-dimensional registered image (step S304: NO), the process proceeds to step S306.

In step S306, the CPU 151 (the composite image generation unit 17) determines whether or not there is a difference in an attachment such as glasses or a mask between the two-dimensional image and the three-dimensional registered image. Here, if the CPU 151 (the composite image generation unit 17) determines that there is a difference in an attachment (step S306: YES), the CPU 151 (the composite image generation unit 17) causes the candidate in the three-dimensional registered image to wear an attachment in accordance with the attachment of the matching target in the two-dimensional image (step S307), and the process proceeds to step S308.

For example, when only the matching target in the two-dimensional image wears glasses, an editing process is performed to cause the candidate in the three-dimensional registered image to wear glasses similar to the glasses of the matching target. The similar glasses may be automatically selected from predetermined templates regarding attachments. On the contrary, when only the candidate in the three-dimensional image wears glasses, an editing process may be performed to cause the candidate in the three-dimensional registered image to put off the glasses.

In contrast, if the CPU 151 (the composite image generation unit 17) determines that there is no difference in an attachment between the two-dimensional image and the three-dimensional registered image (step S306: NO), the process proceeds to step S308. Note that, while it is sufficient to determine a difference in the attachment in accordance with classification of articles, attachments having different appearances, such as typical glasses and sunglasses, may be determined as different articles.

In step S308, the CPU 151 (the composite image generation unit 17) determines whether or not, at the current date and time, a predetermined period has elapsed from an image capture date (registration date) of the three-dimensional registered image. Here, if the CPU 151 (the composite image generation unit 17) determines that the predetermined period has elapsed from the image capture date (step S308: YES), the CPU 151 (the composite image generation unit 17) performs an editing process for simulating a change over the years of the candidate (step S309), and the process proceeds to step S310.

For example, if a period of 10 years has elapsed from an image capture date of a three-dimensional image to the current date and time, an editing process for simulating a 10-year aged state of the candidate is performed. On the contrary, if a capture date and time of a captured image read by the reading apparatus 30 is older than an image registration date of a three-dimensional registered image, an editing process for simulating a state where the candidate of the three-dimensional registered image is rejuvenated may be performed. That is, the composite image generation unit 17 performs an editing process for simulating a change over the years of the aging degree on one of a two-dimensional image and a three-dimensional registered image based on attribute information of the two-dimensional image and the three-dimensional registered image.

In contrast, if the CPU 151 (the composite image generation unit 17) determines that the predetermined period has not yet elapsed from the image capture date (step S308: NO), the process proceeds to step S310. The predetermined period may be set to any period and may be set to a length with which a significant change in the appearance may occur due to elapsed time.

In step S310, if the CPU 151 (the composite image generation unit 17) determines whether or not the type of facial expression of a person is different between the two-dimensional image and the three-dimensional registered image. Here, if the CPU 151 (the composite image generation unit 17) determines that the type of facial expression is different (step S310: YES), the CPU 151 (the composite image generation unit 17) adjusts the type of facial expression of the candidate in the three-dimensional registered image to be consistent with the type of the facial expression of the matching target in the two-dimensional image (step S311), and the process proceeds to step S312.

For example, when the type of facial expression of a matching target in a two-dimensional image is "anger" and the type of facial expression of a candidate in a three-dimensional registered image is "expressionless", an editing process for simulating a state where the type of the facial expression of the candidate is changed to "anger" as with the matching target is performed. Note that an editing process may be performed so as to determine not only the type of facial expression but also the extent of facial expression to have the same extent thereof.

Note that, to determine the type of facial expression, a step of estimating facial expression from a separate image may be provided. Facial expression may be determined by using an external device, and a result thereof may be used. A scheme for determining facial expression is not limited.

In contrast, if the CPU 151 (the composite image generation unit 17) determines that the type of facial expression is not different between the two images (step S310: NO), the process proceeds to step S312.

Then, the CPU 151 (the composite image generation unit 17) generates composite images of the matching target and the candidate (step S312) and, in response, displays the person check window including the composite images on the display device 156 (step S313).

Note that the order of four determination processes in FIG. 10 (steps S304 to S305/steps S306 to S307/steps S308 to S309/steps S310 to S311) is not limited thereto and may be replaced with any order. Further, the same effect and advantage may be obtained by performing these processes in parallel.

Next, specific examples of the editing process in the present example embodiment will be described based on FIG. 11A to FIG. 18D.

(1) Editing Process with Respect to Hair Growth Part

Figure 11A:
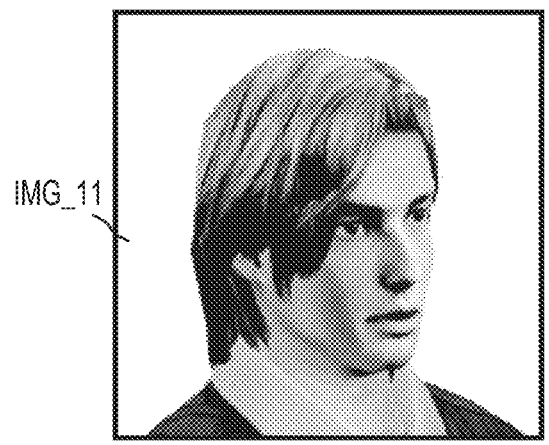
FIG. 11A is a diagram illustrating a two-dimensional image of a matching target in the second example embodiment.
Figure 11B:
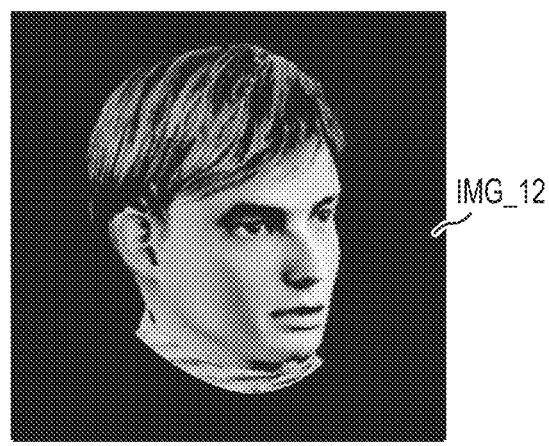
FIG. 11B is a diagram illustrating a three-dimensional registered image of a candidate in the second example embodiment.

FIG. 11A illustrates a two-dimensional image IMG_11 of a matching target, and FIG. 11B illustrates a three-dimensional registered image IMG_12 of a candidate. As illustrated in the two-dimensional image IMG_11, the hairstyle of the candidate is "longhair". As illustrated in the three-dimensional registered image IMG_12, however, the hairstyle of the matching target is "shorthair" and is different from that of the matching target.

Figure 11C:
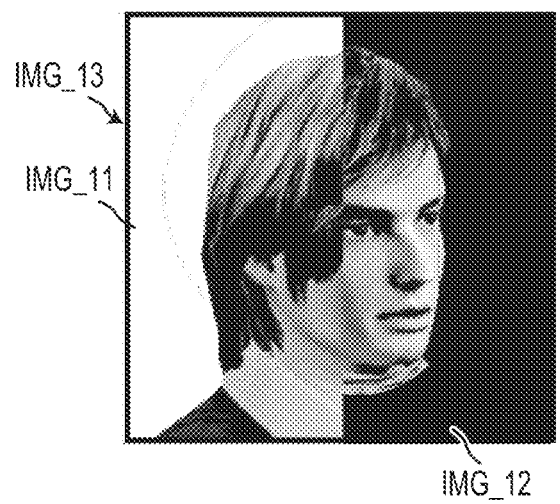
FIG. 11C is a diagram illustrating a horizontally composed image of the two-dimensional image and the three-dimensional registered image in the second example embodiment.
Figure 11D:
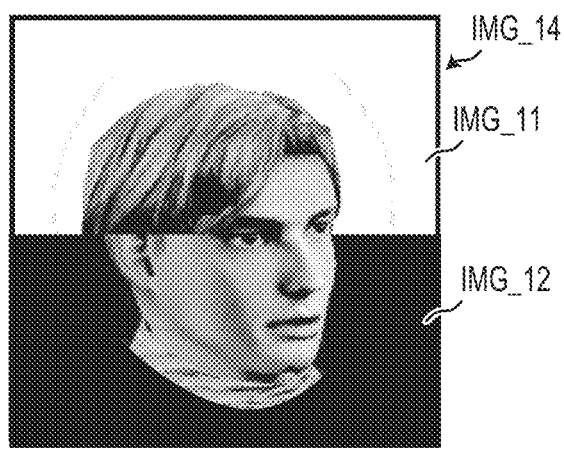
FIG. 11D is a diagram illustrating a vertically composed image of the two-dimensional image and the three-dimensional registered image in the second example embodiment.

Further, FIG. 11C illustrates a horizontally composed image IMG_13 of the two-dimensional image IMG_11 of the matching target and the three-dimensional registered image IMG_12 of the candidate, and FIG. 11D illustrates a vertically composed image IMG_14 thereof.

With reference to the composite image IMG_13 and the composite image IMG_14, it can be seen that positions of face feature portions (eyes, a nose, a mouth, and the like) and the contour of the whole face are the same between the images. However, the hairstyle is significantly different between the two images. Thus, comparison of the composite image IMG_13 and the composite image IMG_14 with the two-dimensional image IMG_11 and the three-dimensional registered image IMG_12 may not be easy.

Figure 12A:
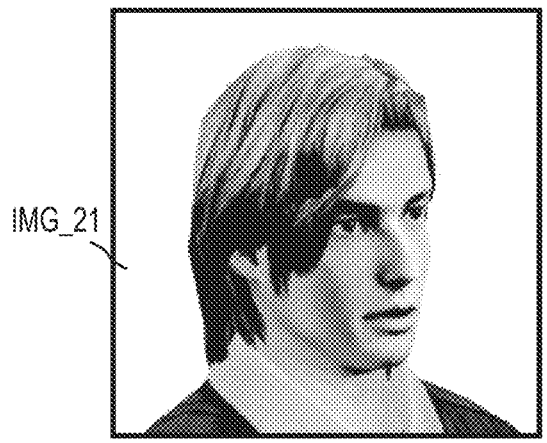
FIG. 12A is a diagram illustrating a two-dimensional image of a matching target in the second example embodiment.
Figure 12B:
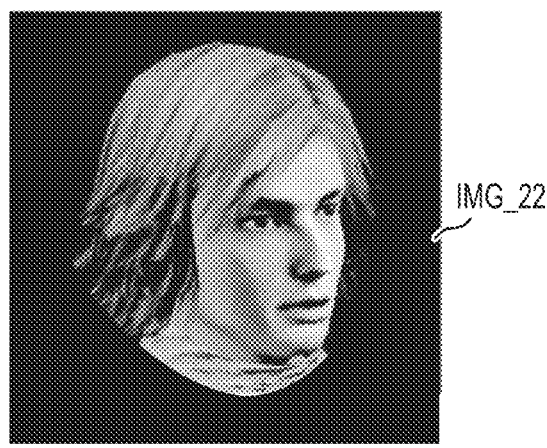
FIG. 12B is a diagram illustrating a three-dimensional edited image of a candidate in the second example embodiment.

In contrast, FIG. 12A illustrates a two-dimensional image IMG_21 of the matching target, and FIG. 12B illustrates a three-dimensional edited image IMG_22 obtained by performing an editing process on the three-dimensional registered image IMG_12 (see FIG. 11B) of the candidate. As illustrated in IMG_21, the hairstyle of the matching target is "longhair". On the other hand, as illustrated in the three-dimensional edited image IMG_22, the hairstyle of the candidate is changed to "longhair" as with the matching target.

Figure 12C:
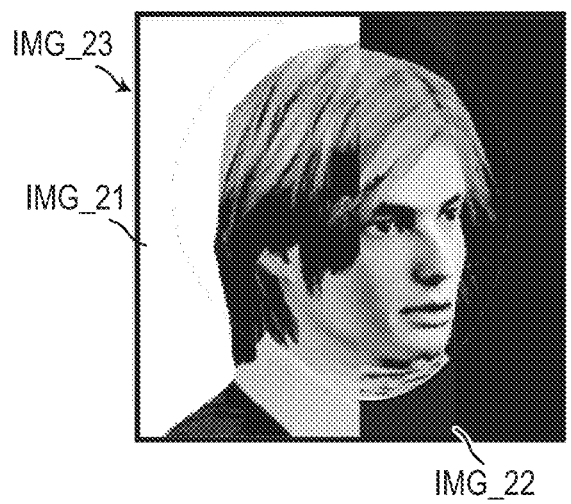
FIG. 12C is a diagram illustrating a horizontally composed image of the two-dimensional image and the three-dimensional edited image in the second example embodiment.
Figure 12D:
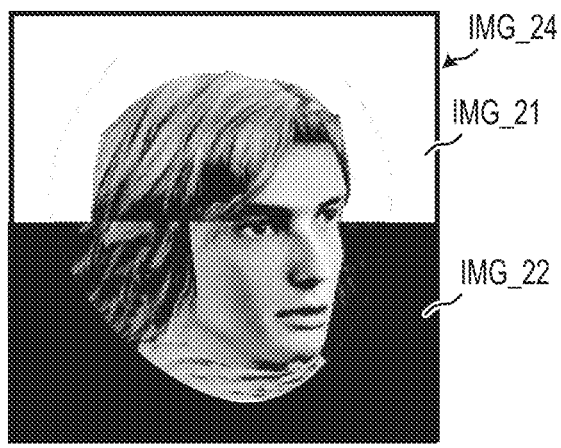
FIG. 12D is a diagram illustrating a three-dimensional edited image in the second example embodiment.

Further, FIG. 12C illustrates a horizontally composed image IMG_23 of the two-dimensional image IMG_21 of the matching target and the three-dimensional edited image IMG_22 of the candidate, and FIG. 12D illustrates a vertically composed image IMG_24 thereof.

With reference to the composite image IMG_23 and the composite image IMG_24, it can be seen that positions of face feature portions (eyes, a nose, a mouth, and the like) and the contour of the whole face are the same between the images. Furthermore, since the hairstyle is unified in substantially the same manner between the two images to be composed, the composite image IMG_23 and the composite image IMG_24 are images having a unified look in the horizontal direction and the vertical direction. Thus, comparison of the composite image IMG_23 and the composite image IMG_24 with the two-dimensional image IMG_21 and the three-dimensional edited image IMG_22 is easier than in the case of FIG. 11A to FIG. 11D.

(2) Editing Process with Respect to Attachment

Figure 13A:
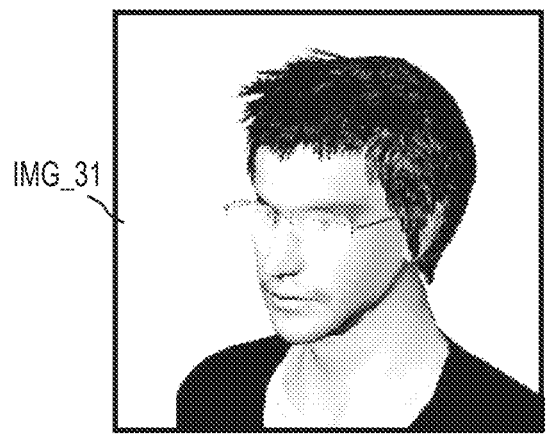
FIG. 13A is a diagram illustrating a two-dimensional image of a matching target in the second example embodiment.
Figure 13B:
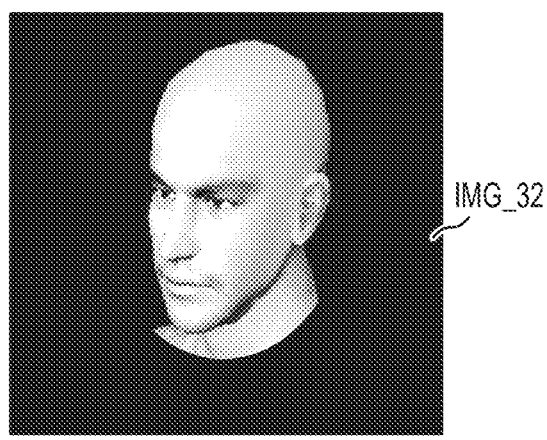
FIG. 13B is a diagram illustrating a three-dimensional registered image of a candidate in the second example embodiment.

FIG. 13A illustrates a two-dimensional image IMG_31 of a matching target, and FIG. 13B illustrates a three-dimensional registered image IMG_32 of a candidate. As illustrated in the two-dimensional image IMG_31, the matching target wears the attachment "glasses". As illustrated in the three-dimensional registered image IMG_32, however, the candidate does not wear "glasses" and has a different hairstyle.

Figure 13C:
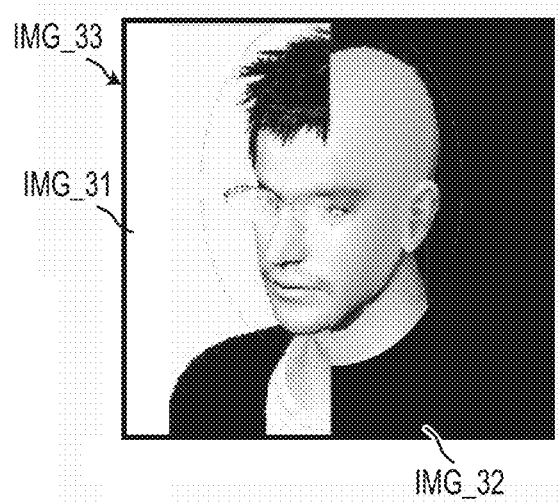
FIG. 13C is a diagram illustrating a horizontally composed image of the two-dimensional image and the three-dimensional registered image in the second example embodiment.
Figure 13D:
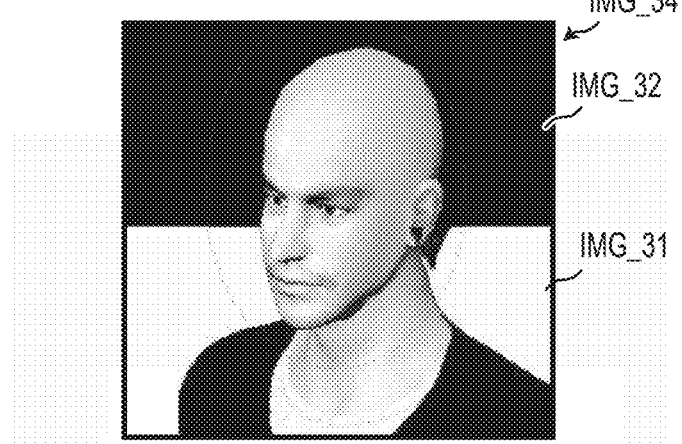
FIG. 13D is a diagram illustrating a vertically composed image of the two-dimensional image and the three-dimensional registered image in the second example embodiment.

Further, FIG. 13C illustrates a horizontally composed image IMG_33 of the two-dimensional image IMG_31 of the matching target and the three-dimensional registered image IMG_32 of the candidate, and FIG. 13D illustrates a vertically composed image IMG_34 thereof.

With reference to the composite image IMG_33 and the composite image IMG_34, one of the two images to be composed has the attachment and hair but the other does not. Thus, comparison of the composite image IMG_33 and the composite image IMG_34 with the two-dimensional image IMG_31 and the three-dimensional registered image IMG_32 may not be easy.

Figure 14A:
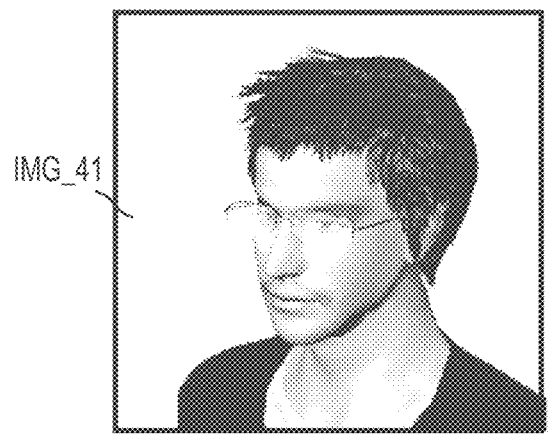
FIG. 14A is a diagram illustrating a two-dimensional image of a matching target in the second example embodiment.
Figure 14B:
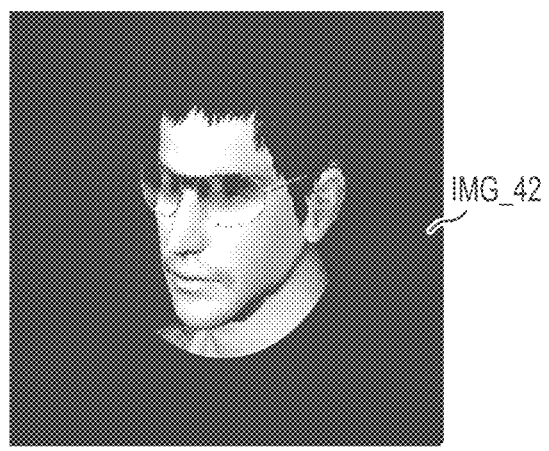
FIG. 14B is a diagram illustrating a three-dimensional edited image of a candidate in the second example embodiment.

In contrast, FIG. 14A illustrates a two-dimensional image IMG_41 of the matching target, and FIG. 14B illustrates a three-dimensional edited image IMG_42 obtained by performing an editing process on the three-dimensional registered image IMG_32 (see FIG. 13B) of the candidate. As illustrated in IMG_41, the matching target wears the attachment "glasses". On the other hand, as illustrated in the three-dimensional edited image IMG_42, the candidate wears the attachment "glasses" as with the matching target and has a changed hairstyle.

Figure 14C:
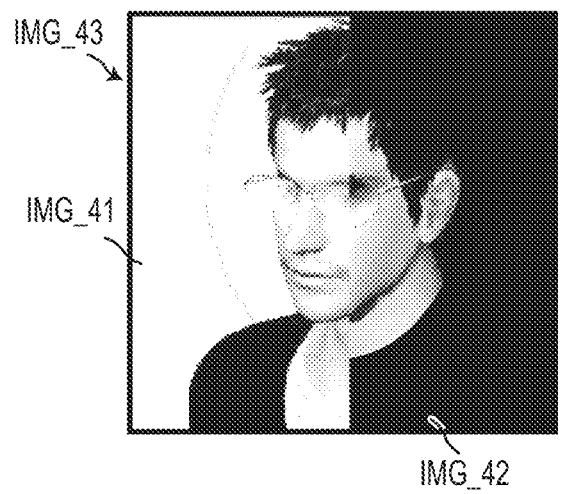
FIG. 14C is a diagram illustrating a horizontally composed image of the two-dimensional image and the three-dimensional edited image in the second example embodiment.
Figure 14D:
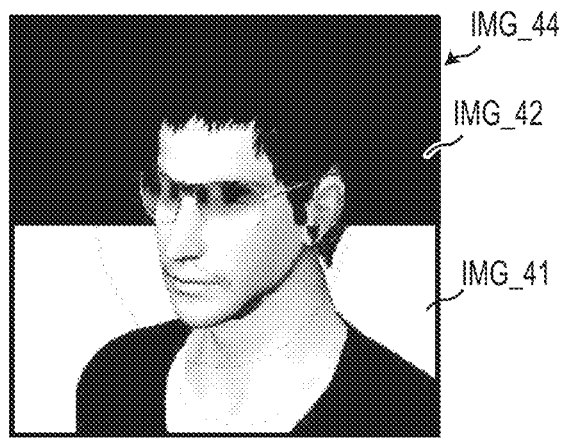
FIG. 14D is a diagram illustrating a three-dimensional edited image in the second example embodiment.

Further, FIG. 14C illustrates a horizontally composed image IMG_43 of the two-dimensional image IMG_41 of the matching target and the three-dimensional edited image IMG_42 of the candidate, and FIG. 14D illustrates a vertically composed image IMG_44 thereof.

With reference to the composite image IMG_43 and the composite image IMG_44, since the presence or absence of an attachment and the hairstyle are unified between the two images to be composed, the composite image IMG_43 and the composite image IMG_44 are images having a unified look in the horizontal direction and the vertical direction. Thus, comparison of the composite image IMG_43 and the composite image IMG_44 with the two-dimensional image IMG_41 and the three-dimensional edited image IMG_42 is easier than in the case of FIG. 13A to FIG. 13D.

(3) Editing Process with Respect to Change in Facial Expression

Figure 15A:
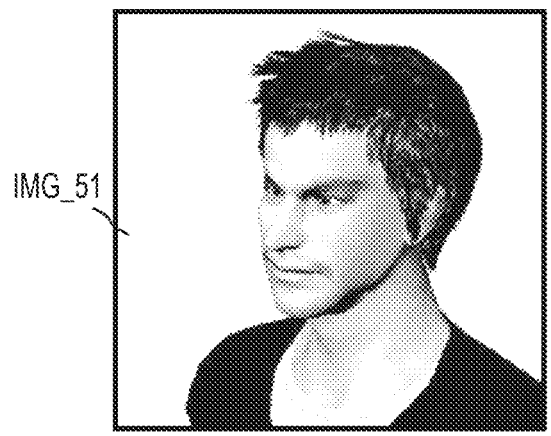
FIG. 15A is a diagram illustrating a two-dimensional image of a matching target in the second example embodiment.
Figure 15B:
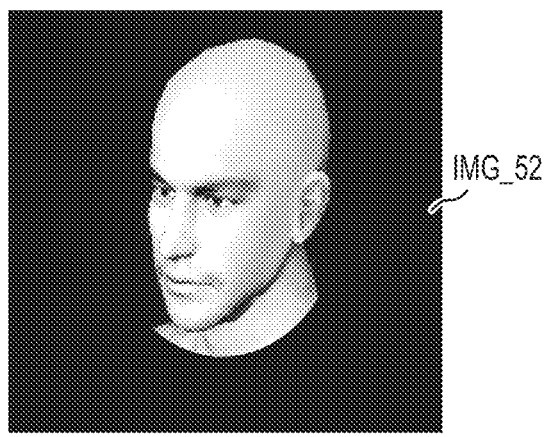
FIG. 15B is a diagram illustrating a three-dimensional registered image of a candidate in the second example embodiment.

FIG. 15A illustrates a two-dimensional image IMG_51 of a matching target, and FIG. 15B illustrates a three-dimensional registered image IMG_52 of a candidate. As illustrated in the two-dimensional image IMG_51, the facial expression of the matching target is "anger" of frowning. As illustrated in the three-dimensional registered image IMG_52, however, the facial expression of the candidate has usual facial expression ("expressionless") and has a different hairstyle.

Figure 15C:
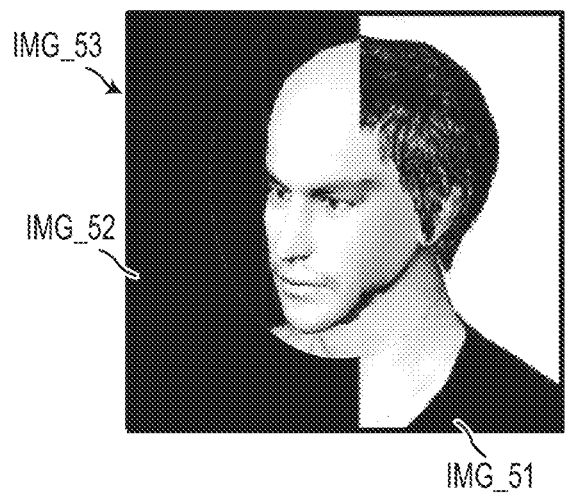
FIG. 15C is a diagram illustrating a horizontally composed image of the two-dimensional image and the three-dimensional registered image in the second example embodiment.
Figure 15D:
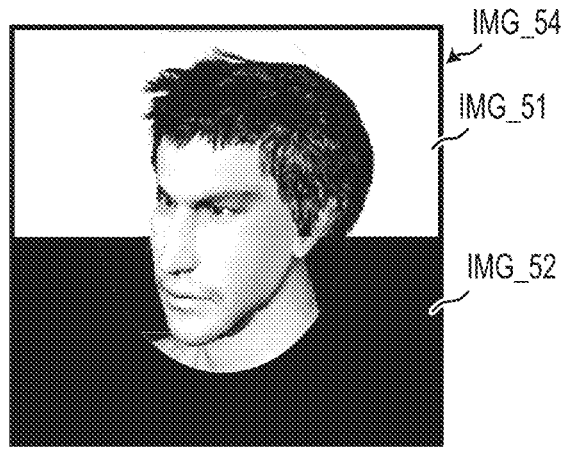
FIG. 15D is a diagram illustrating a vertically composed image of the two-dimensional image and the three-dimensional registered image in the second example embodiment.

Further, FIG. 15C illustrates a horizontally composed image IMG_53 of the two-dimensional image IMG_51 of the matching target and the three-dimensional registered image IMG_52 of the candidate, and FIG. 15D illustrates a vertically composed image IMG_54 thereof.

With reference to the composite image IMG_53 and the composite image IMG_54, the facial expression and the hairstyle of persons are significantly different between the two images to be composed. Thus, comparison of the composite image IMG_53 and the composite image IMG_54 with the two-dimensional image IMG_51 and the three-dimensional registered image IMG_52 may not be easy.

Figure 16A:
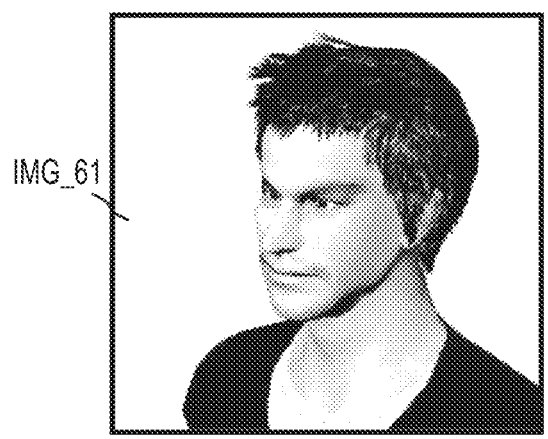
FIG. 16A is a diagram illustrating a two-dimensional image of a matching target in the second example embodiment.
Figure 16B:
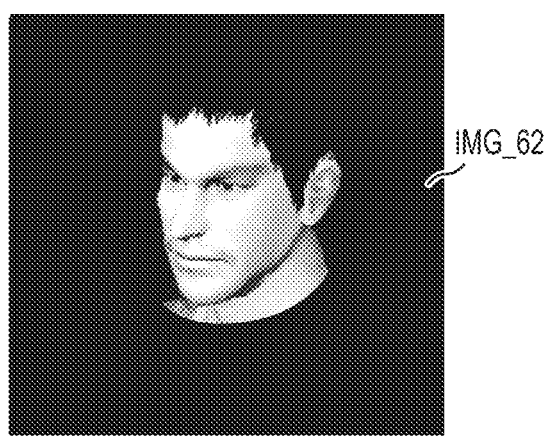
FIG. 16B is a diagram illustrating a three-dimensional edited image of a candidate in the second example embodiment.

In contrast, FIG. 16A illustrates a two-dimensional image IMG_61 of the matching target, and FIG. 16B illustrates a three-dimensional edited image IMG_62 obtained by performing an editing process on the three-dimensional registered image IMG_52 (see FIG. 15B) of the candidate. As illustrated in the two-dimensional image IMG_61, the facial expression of the matching target is a facial expression of "anger". On the other hand, as illustrated in the three-dimensional edited image IMG_62, the hairstyle has been changed, and in addition, the facial expression of the candidate has been changed to the facial expression of "anger" as with the matching target. That is, an editing process for simulating a facial expression change is performed.

Figure 16C:
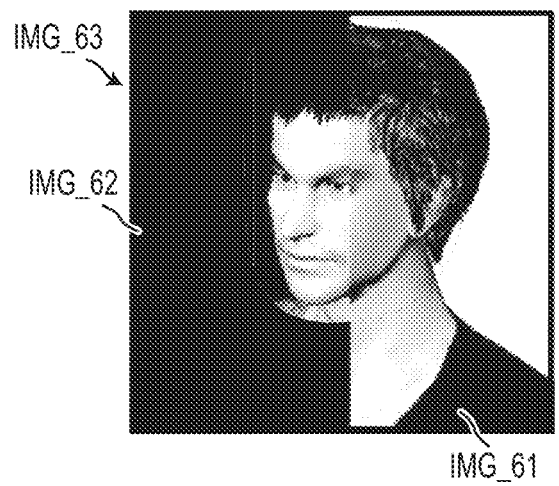
FIG. 16C is a diagram illustrating a horizontally composed image of the two-dimensional image and the three-dimensional edited image in the second example embodiment.
Figure 16D:
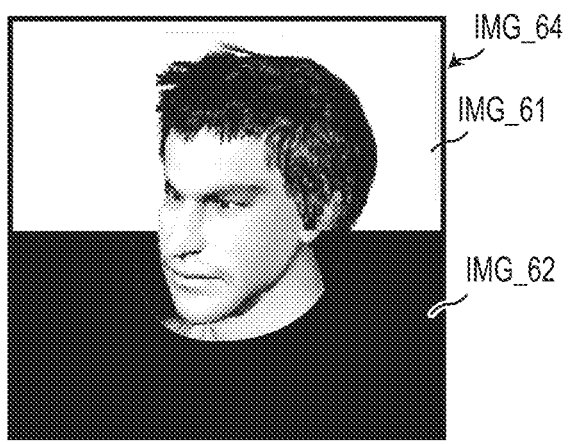
FIG. 16D is a diagram illustrating a three-dimensional edited image in the second example embodiment.

Further, FIG. 16C illustrates a horizontally composed image IMG_63 of the two-dimensional image IMG_61 of the matching target and the three-dimensional edited image IMG_62 of the candidate, and FIG. 16D illustrates a vertically composed image IMG_64 thereof.

With reference to the composite image IMG_63 and the composite image IMG_64, since the facial expression and the hairstyle of persons are unified between the two images to be composed, the composite image IMG_63 and the composite image IMG_64 are images having a unified look in the horizontal direction and the vertical direction. Thus, comparison of the composite image IMG_63 and the composite image IMG_64 with the two-dimensional image IMG_61 and the three-dimensional edited image IMG_62 is easier than in the case of FIG. 15A to FIG. 15D.

(4) Editing Process with Respect to Change Over the Years

Figure 17A:
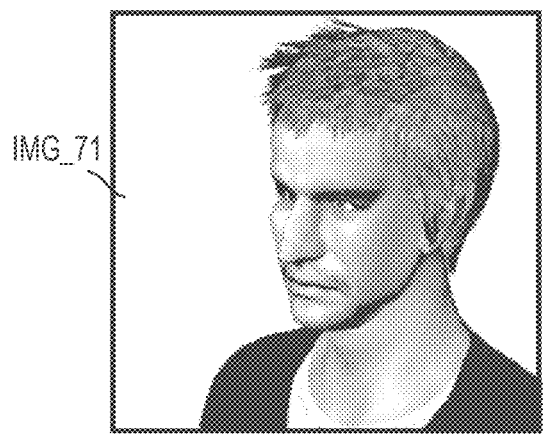
FIG. 17A is a diagram illustrating a two-dimensional image of a matching target in the second example embodiment.
Figure 17B:
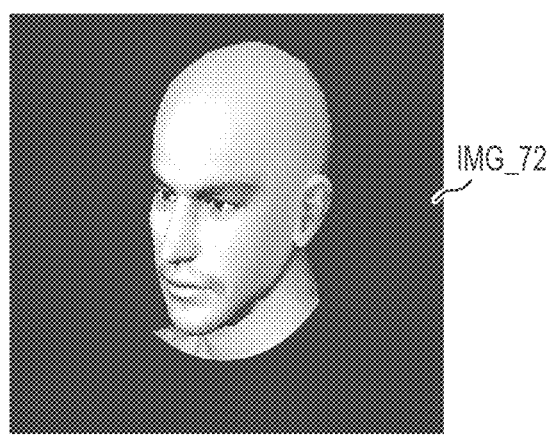
FIG. 17B is a diagram illustrating a three-dimensional registered image of a candidate in the second example embodiment.

FIG. 17A illustrates a two-dimensional image IMG_71 of a matching target, and FIG. 17B illustrates a three-dimensional registered image IMG_72 of a candidate. As illustrated in the two-dimensional image IMG_71, the matching target is an elderly man. On the other hand, the candidate illustrated in the three-dimensional registered image IMG_72 is a man in his thirties (see FIG. 3) and has a different hairstyle.

Figure 17C:
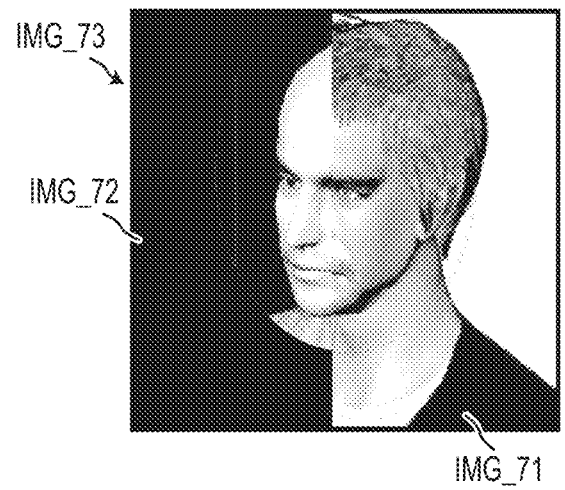
FIG. 17C is a diagram illustrating a horizontally composed image of the two-dimensional image and the three-dimensional registered image in the second example embodiment.
Figure 17D:
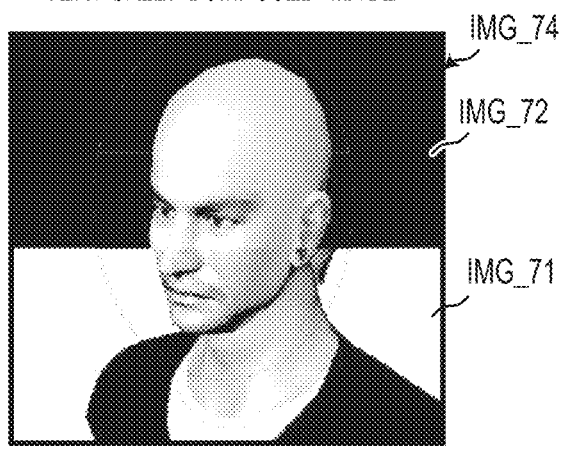
FIG. 17D is a diagram illustrating a vertically composed image of the two-dimensional image and the three-dimensional registered image in the second example embodiment.

FIG. 17C illustrates a horizontally composed image IMG_73 of the two-dimensional image IMG_71 of the matching target and the three-dimensional registered image IMG_72 of the candidate, and FIG. 17D illustrates a vertically composed image IMG_74 thereof.

With reference to the composite image IMG_73 and the composite image IMG_74, the aging degree and the hairstyle of persons are significantly different between the two images to be composed. Thus, comparison of the composite image IMG_73 and the composite image IMG_74 with the two-dimensional image IMG_71 and the three-dimensional registered image IMG_72 may not be easy.

Figure 18A:
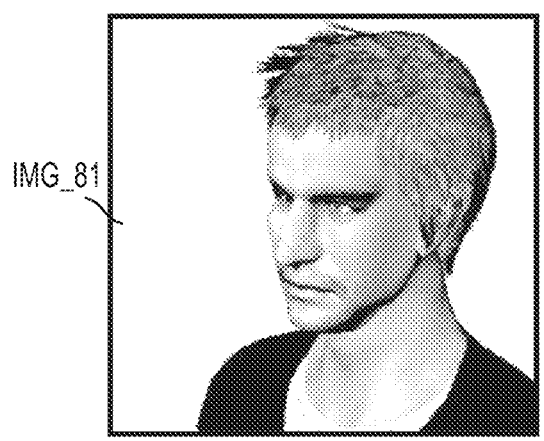
FIG. 18A is a diagram illustrating a two-dimensional image of a matching target in the second example embodiment.
Figure 18B:
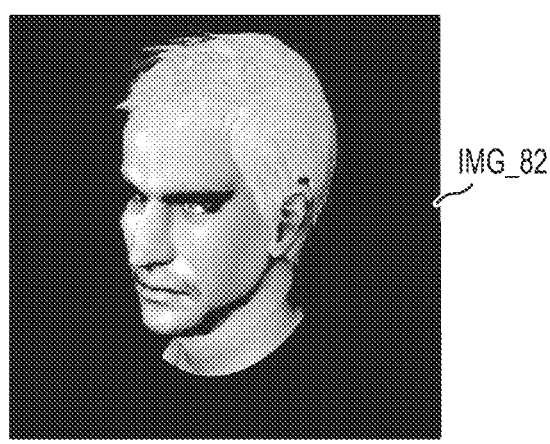
FIG. 18B is a diagram illustrating a three-dimensional edited image of a candidate in the second example embodiment.

In contrast, FIG. 18A illustrates a two-dimensional image IMG_81 of the matching target, and FIG. 18B illustrates a three-dimensional edited image IMG_82 obtained by performing an editing process on the three-dimensional registered image IMG_72 (see FIG. 17B) of the candidate. As illustrated in the two-dimensional image IMG_81, the matching target is an elderly man in his sixties or older. On the other hand, as illustrated in the three-dimensional edited image IMG_82, the candidate not only has a changed hairstyle but also looks aged for around 30 years as with the matching target. That is, an editing process for simulating a change over the years is performed.

Figure 18C:
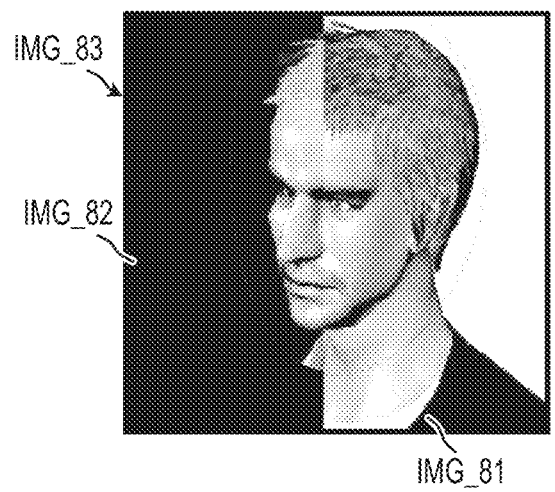
FIG. 18C is a diagram illustrating a horizontally composed image of the two-dimensional image and the three-dimensional edited image in the second example embodiment.
Figure 18D:
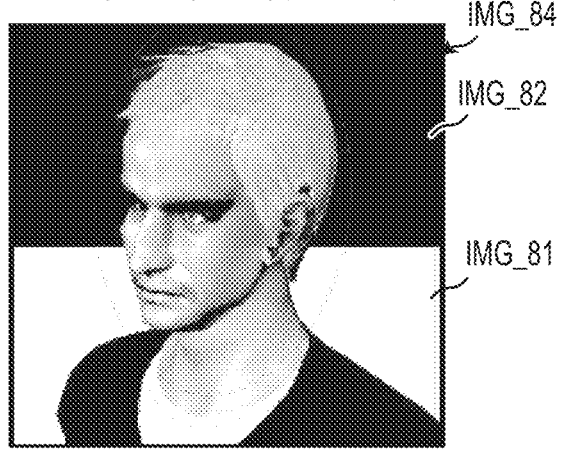
FIG. 18D is a diagram illustrating a three-dimensional edited image in the second example embodiment.

FIG. 18C illustrates a horizontally composed image IMG_83 of the two-dimensional image IMG_81 of the matching target and the three-dimensional edited image IMG_82 of the candidate, and FIG. 18D illustrates a vertically composed image IMG_84 thereof.

With reference to the composite image IMG_83 and the composite image IMG_84, since the aging degree and the hairstyle of persons are unified between the two images to be composed, the composite image IMG_83 and the composite image IMG_84 are images having a unified look in the horizontal direction and the vertical direction. Thus, comparison of the composite image IMG_83 and the composite image IMG_84 with the two-dimensional image IMG_81 and the three-dimensional edited image IMG_82 is easier than in the case of FIG. 17A to FIG. 17D.

Note that, while four types of editing processes have been described, the type of editing processes is not limited thereto. For example, an editing process for causing the influence degree of environmental light, wearing makeup or not, or the like to be the same between a matching target and a candidate may be performed.

As described above, the image matching apparatus 10 in the present example embodiment performs an editing process for changing the appearance of a registrant on a three-dimensional registered image when superimposing a two-dimensional image of a matching target on the three-dimensional registered image of the registrant (the candidate) to generate a composite image. For example, even when the similarity degree (the matching score) calculated in an image matching process is high, a person having a different visual impression may be extracted as a candidate due to various factors such as the presence or absence of an attachment, facial expression of a person, aging, or the like. Even in such a case, by changing the appearance of a registrant to be consistent with the matching target, it is possible to generate a composite image having a unified look as a whole. As a result, the user can effectively perform a visual check operation based on the composite image.

Further, in the present example embodiment, an editing process is automatically performed based on a comparison result between a two-dimensional image and a three-dimensional image. This enables the user to obtain a composite image without performing a designation operation.

Note that, while the case where an editing process is performed on a three-dimensional registered image of a registrant to be consistent with a two-dimensional image of a matching target has been described in the present example embodiment, an editing process (for example, edition to add "glasses" or "beard" or the like) may be performed on a two-dimensional image of a matching target to be consistent with a three-dimensional registered image. Further, an editing process may be performed on a predetermined image region at time after a composite image is generated without being limited to at time before the generation of a composite image. That is, the image matching apparatus 10 may perform an editing process for changing the appearance of a person or a registrant on at least one of a two-dimensional image, a three-dimensional registered image, and a composite image.

Further, while a composite image is generated between a person selected from a plurality of registrants listed by performing a matching process and a matching target as with the first example embodiment in the present example embodiment, such listing may not be performed. For example, a registrant to be matched with a matching target may be designated by a user operation, and a composite image may be generated from a two-dimensional image and a three-dimensional edited image. Further, the composite image generation unit 17 may be configured to automatically perform generation and editing processes of a composite image in descending order of similarity degree without requiring a selection operation performed by a user.

Furthermore, the composite image generation unit 17 may perform an editing process for an item selected from a plurality of target items regarding the appearance based on a user operation. For example, when only "presence or absence of attachment" is designated by a user operation, it is possible to perform an editing process on only the attachment without taking into consideration of a change in facial expression a person, a change in environmental light, or the like. This enables the user to avoid performing an unnecessary editing process. Further, the composite image generation unit 17 may be configured to perform an editing process again when an edition menu is again selected by a user operation.

Third Example Embodiment

The image matching system 1 in a third example embodiment will be described below. Note that a reference common to the reference provided in the drawings of the first example embodiment indicates the same component. The description of features common to the first example embodiment will be omitted, and different features will be described in detail.

The matching mode select unit 14 of the present example embodiment is different from that of the first example embodiment in a determination condition used for selecting the type of a registered image to be used for matching from one of a two-dimensional registered image and a three-dimensional registered image. Specific examples of determination conditions may be (A) to (F) or the like below.

(A) Face Orientation

The matching mode select unit 14 selects the 2D matching mode when the angle of the face orientation of a matching target relative to the front direction is within a predetermined threshold (for example, 30 degrees) as with the first example embodiment. The matching mode select unit 14 selects the 3D matching mode when the threshold is exceeded.

(B) Facial Expression Change

The matching mode select unit 14 analyzes a two-dimensional image and selects the 2D matching mode when the change degree of facial expression of a matching target relative to a usual state (for example, at the time of expressionlessness) is within a range suitable to the 2D matching mode (hereafter, referred to as "tolerance range"). The matching mode select unit 14 selects the 3D matching mode when the change degree exceeds the tolerance range.

For example, when the facial expression of a matching target is "hearty laugh", "furious anger", or the like, it is expected that such facial expression is significantly different from the facial expression in the two-dimensional registered image. Thus, the matching mode select unit 14 selects the 3D matching mode. On the contrary, when the facial expression of a matching target is "expressionless", "smile", or the like, it is expected that such facial expression is close to the facial expression in the two-dimensional registered image. Thus, the matching mode select unit 14 selects the 2D matching mode.

Note that, to determine the type of facial expression, a step of estimating facial expression from a separate image may be provided. Facial expression may be determined by using an external device, and a result thereof may be used. A scheme for determining facial expression is not limited.

(C) Influence Degree of Illumination Light (Environmental Light)

The matching mode select unit 14 analyzes a two-dimensional image and selects the 2D matching mode when the influence degree of illumination light on a matching target is within a tolerance range of the 2D matching mode. The matching mode select unit 14 selects the 3D matching mode when the influence degree of illumination light exceeds the tolerance range.

For example, when the influence degree of illumination light on a matching target is large and a dark shade appears on a face image, it is expected that the influence degree of illumination light, that is, a capturing condition is significantly different from that for a two-dimensional registered image captured under a dimmed environment and the tolerance range is exceeded. On the other hand, in the 3D matching mode, since it is possible to cause a condition of a 3D model (three-dimensional registered image) to be consistent with a capturing condition of a security camera, matching accuracy increases. Thus, the matching mode select unit 14 selects the 3D matching mode. It is also preferable to supplement the position of a light source that irradiates a face, the presence or absence of glasses, or the like by using the 3D model (three-dimensional registered image). On the contrary, when the influence degree of illumination light on a matching target is within the tolerance range of the 2D matching mode, such an influence degree is close to the influence degree of lighting in the two-dimensional registered image. Thus, the matching mode select unit 14 selects the 2D matching mode. Note that there may be a change in light and shade not caused by environmental light. Specifically, a change in skin color due to a suntan or the like is assumed. The matching mode select unit 14 selects the 3D matching mode when the influence degree including a change in light and shade not caused by environmental light exceeds the tolerance range of the 2D matching mode.

(D) Change Over the Years

The matching mode select unit 14 selects the 2D matching mode when a capturing date recorded as attribute information on a two-dimensional image is within a predetermined period from the current date. The matching mode select unit 14 selects the 3D matching mode when the capturing date is out of the predetermined period.

For example, when the current date is "Dec. 1, 2018" and a capturing date of an acquired two-dimensional image is "Oct. 1, 1997", the elapsed period from the capturing date is long, and a significant change in the appearance is expected. Thus, the matching mode select unit 14 selects the 3D matching mode with priority. On the contrary, in a case such as where a capturing date of a two-dimensional image is the same as or within one month from the current date, it is expected that there is no significant change in the appearance. Thus, the matching mode select unit 14 prioritizes and selects the 2D matching mode in which the matching speed is high.

(E) Area and Type of Recognizable Part

The matching mode select unit 14 analyses a two-dimensional image and selects the 2D matching mode when the area and the type of the recognizable part in a face satisfy a matching condition in the 2D matching mode. The matching mode select unit 14 selects the 3D matching mode when the matching condition in the 2D matching mode is not satisfied. For example, it is preferable to select the 3D matching mode when there is only an area where a face region of a matching target may not be recognized due to the presence of another person or an object. Similarly, a matching mode may be selected in accordance with which part of an eye, an ear, a nose, or the like the recognizable part within an image is. For example, the 3D matching mode is selected when only one of the eyes of a matching target is included in an acquired face image.

(F) Presence or Absence of Attachment

The matching mode select unit 14 analyzes a two-dimensional image and selects the 2D matching mode when an attachment (glasses, a mask, a cap, or the like) is absent in a face portion of a matching target. The matching mode select unit 14 selects the 3D matching mode when an attachment is present. For example, when a matching target wears sunglasses or a mask, the matching mode select unit 14 selects the 3D matching mode. Note that some type of attachment may be an article that does not affect a face matching. For example, it may be unnecessary to take an attachment such as a piercing jewelry or an earring into consideration in selection of a matching mode.

Further, when the 3D matching mode is selected, it is preferable that the matching mode select unit 14 of the present example embodiment instruct the composite image generation unit 17 to perform, on the three-dimensional image to be matched, an adjustment process (correction of the face orientation) or an editing process (adjustment of a facial expression change/influence of environmental light/a change over the years/an attachment) associated with a condition which a two-dimensional image corresponds to out of (A) to (F) described above.

Figure 19:
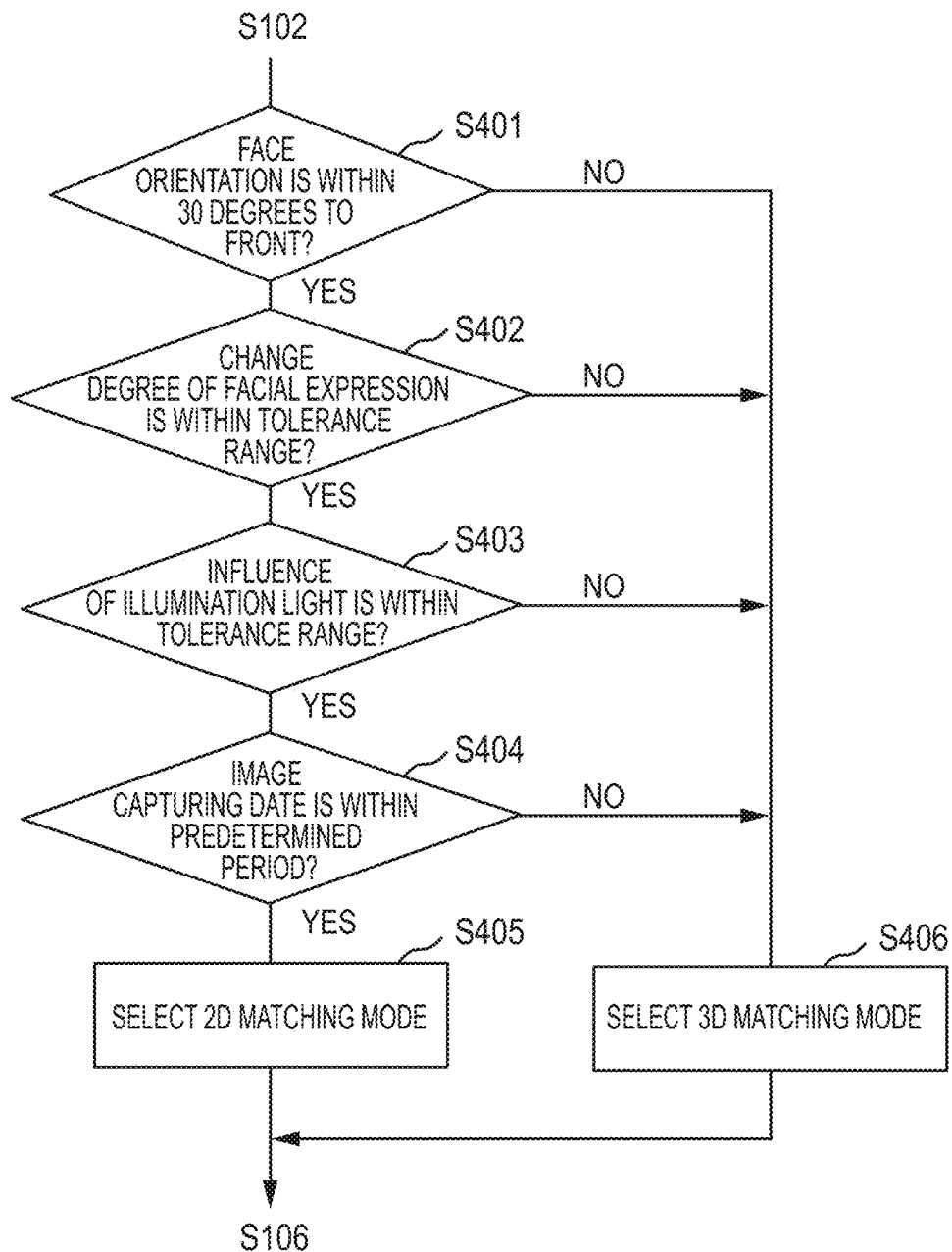
FIG. 19 is a flowchart illustrating one example of a selection process of a matching mode in a third example embodiment.

FIG. 19 is a flowchart illustrating an example of a select process of a matching mode in the present example embodiment. This process is to replace the process between step S102 and step S106 of the flowchart illustrated in FIG. 6.

In step S102 illustrated in FIG. 6, in response to the CPU 151 (the image analysis unit 13) analyzing a two-dimensional image and detecting the face orientation of a matching target, the CPU 151 (the matching mode select unit 14) determines whether or not the detected face orientation is within 30 degrees (threshold) with respect to the front (step S401). Here, if the CPU 151 (the matching mode select unit 14) determines that the face orientation is within 30 degrees with respect to the front (step S401: YES), the process proceeds to step S402.

In contrast, if the CPU 151 (the matching mode select unit 14) determines that the face orientation is not within 30 degrees with respect to the front (step S401: NO), the process proceeds to step S406.

In step S402, the CPU 151 (the matching mode select unit 14) determines whether or not a change in facial expression from a usual state (expressionless) is within a tolerance range in the 2D matching mode. Here, if the CPU 151 (the matching mode select unit 14) determines that a change in facial expression from the usual state (expressionless) is within the tolerance range in the 2D matching mode (step S402: YES), the process proceeds to step S403.

In contrast, if the CPU 151 (the matching mode select unit 14) determines that a change in facial expression from the usual state (expressionless) exceeds the tolerance range in the 2D matching mode (step S402: NO), the process proceeds to step S406.

In step S403, the CPU 151 (the matching mode select unit 14) determines whether or not the influence degree of illumination light on the matching target is within a tolerance range in the 2D matching mode. Here, if the CPU 151 (the matching mode select unit 14) determines that the influence degree of illumination light is within the tolerance range in the 2D matching mode (step S403: YES), the process proceeds to step S404.

In contrast, if the CPU 151 (the matching mode select unit 14) determines that the influence degree of illumination light exceeds the tolerance range in the 2D matching mode (step S403: NO), the process proceeds to step S406.

In step S404, the CPU 151 (the matching mode select unit 14) references attribute information on the two-dimensional image and determines whether or not the capturing date of the two-dimensional image is within a predetermined period. Here, if the CPU 151 (the matching mode select unit 14) determines that the capturing date of the two-dimensional image is within the predetermined period (step S404: YES), the process proceeds to step S405.

In contrast, if the CPU 151 (the matching mode select unit 14) determines that the capturing date of the two-dimensional image is not within the predetermined period (step S404: NO), the process proceeds to step S406.

In step S405, if the CPU 151 (the matching mode select unit 14) selects the 2D matching mode as a matching mode, the process proceeds to step S106 of FIG. 6.

In step S406, if the CPU 151 (the matching mode select unit 14) selects the 3D matching mode as a matching mode, the process proceeds to step S106 of FIG. 6.

Note that the order of steps S401 to S404 in FIG. 19 is not limited to the above and is interchangeable. Further, the same effect and advantage may be obtained by performing these processes in parallel.

As described above, the image matching apparatus 10 in the present example embodiment selects the type of a registered image used for matching with a two-dimensional image based on a value obtained by image analysis of the two-dimensional image and a plurality of determination conditions. This enables a matching process by using the optimal matching mode.

Note that the determination condition for selecting a matching mode is not limited to the above. For example, determination may be made by a condition such as the presence or absence of an attachment, the presence or absence of a scar and the size thereof, or the like. Further, the 2D matching mode, which is superior in a processing speed, may be selected when the number of persons included in a two-dimensional image is large, and the 3D matching mode, which has flexibility for a capturing angle, may be selected when the number of persons is small.

Fourth Example Embodiment

Figure 20:
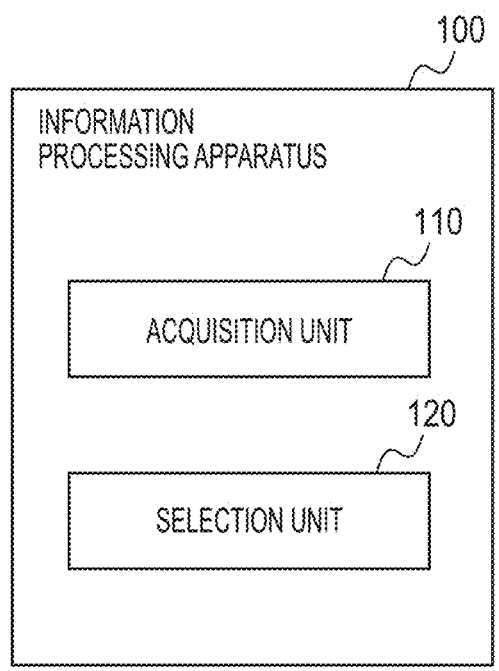
FIG. 20 is a block diagram illustrating the function of an information processing apparatus in a fourth example embodiment.

FIG. 20 is a block diagram illustrating the function of the information processing apparatus 100 in a fourth example embodiment. The information processing apparatus 100 has an acquisition unit 110 and a selection unit 120. The acquisition unit 110 acquires a two-dimensional image of a person, and a registered image group including two-dimensional registered images and three-dimensional registered images of a plurality of registrants. The selection unit 120 selects a type of a registered image to be used for matching from one of the two-dimensional registered images and the three-dimensional registered images based on the two-dimensional image, prior to the matching the two-dimensional image with the registered image group. According to the present example embodiment, the speed of the matching process for person images can be increased.

Modified Example Embodiments

While this disclosure has been described above with reference to the example embodiments, this disclosure is not limited to the example embodiments described above. Various modifications that may be appreciated by those skilled in the art can be made to the configuration and the details of this disclosure within a scope not departing from the spirit of this disclosure. For example, it is to be appreciated that an example embodiment in which a part of the configuration of any of the example embodiments is added to another example embodiment or an example embodiment in which a part of the configuration of any of the example embodiments is replaced with a part of the configuration of another example embodiment is also one of the example embodiments to which this disclosure may be applied.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, a ROM, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
an acquisition unit that acquires a two-dimensional image of a person, and a registered image group including two-dimensional registered images and three-dimensional registered images of a plurality of registrants; and
a selection unit that selects a type of a registered image to be used for matching from one of the two-dimensional registered images and the three-dimensional registered images based on the two-dimensional image, prior to the matching the two-dimensional image with the registered image group.

(Supplementary Note 2)

The information processing apparatus according to supplementary note 1, wherein the selection unit selects the type of the registered image based on the face orientation of the person in the two-dimensional image.

(Supplementary Note 3)

The information processing apparatus according to supplementary note 2, wherein the selection unit selects the two-dimensional registered image when the angle formed by the face orientation of the person and the reference direction in the two-dimensional image is not less than a predetermined threshold value, and selects the three-dimensional registered image when the angle exceeds the threshold value.

(Supplementary Note 4)

The information processing apparatus according to supplementary note 2 or 3 further comprising a matching unit that matches the two-dimensional image with the registered image group,
wherein the matching unit adjusts the face orientation of the registrant in the three-dimensional registered image to be consistent with the face orientation of a person in the two-dimensional image when the three-dimensional registered image is used for the matching.

(Supplementary Note 5)

The information processing apparatus according to supplementary note 1, wherein the selection unit selects the type of the registered image based on the relationship between the person and the illumination light in the two-dimensional image.

(Supplementary Note 6)

The information processing apparatus according to supplementary note 1, wherein the selection unit selects the type of the registered image based on an expression of the person in the two-dimensional image.

(Supplementary Note 7)

The information processing apparatus according to supplementary note 1, wherein the selection unit selects the type of the registered image based on an elapsed period from the capturing date of the two-dimensional image.

(Supplementary Note 8)

The information processing apparatus according to any one of supplementary notes 1 to 7 further comprising a display information generation unit that extracts a plurality of candidates from the plurality of registrants and generates display information used for displaying the extracted candidates in order in accordance with the similarity degree based on the similarity degree obtained by matching the two-dimensional image of the matching target with a registered image group.

(Supplementary Note 9)

The information processing apparatus according to supplementary note 8 further comprising a composite image generation unit that superimposes the three-dimensional registered image of a person selected from a plurality of candidates by a user operation on the two-dimensional image and generates a composite image.

(Supplementary Note 10)

The information processing apparatus according to supplementary note 9, wherein the composite image generation unit performs an editing process for changing the appearance of the person or the registrant on at least one of the two-dimensional image, the three-dimensional registered image, and the composite image when generating the composite image.

(Supplementary Note 11)

An information processing method comprising:
acquiring a two-dimensional image of a person, and a registered image group including two-dimensional registered images and three-dimensional registered images of a plurality of registrants; and
selecting a type of a registered image to be used for matching from one of the two-dimensional registered images and the three-dimensional registered images based on the two-dimensional image, prior to the matching the two-dimensional image with the registered image group.

(Supplementary Note 12)

A storage medium in which a program is stored, the program that causes a computer to perform:
acquiring a two-dimensional image of a person, and a registered image group including two-dimensional registered images and three-dimensional registered images of a plurality of registrants; and
selecting a type of a registered image to be used for matching from one of the two-dimensional registered images and the three-dimensional registered images based on the two-dimensional image, prior to the matching the two-dimensional image with the registered image group.

This application is based upon and claims the benefit of priority from Japanese Patent Application No. 2018-244593, filed on Dec. 27, 2018, the disclosure of which is incorporated herein in its entirety by reference.

REFERENCE SIGNS LIST 1 image matching system
10 image matching apparatus
11 storage unit
12 image acquisition unit
13 image analysis unit
14 matching mode select unit
15 matching unit
16 display information generation unit
17 composite image generation unit
20 image capturing apparatus
30 reading apparatus
40 network
100 information processing apparatus
110 acquisition unit
120 selection unit
151 CPU
152 RAM
153 ROM
154 HDD
155 communication I/F
156 display device
157 input device
158 bus

What is claimed is:

1. An information processing apparatus comprising:
an acquisition unit that acquires a two-dimensional image of a person, and a registered image group including two-dimensional registered images and three-dimensional registered images of a plurality of registrants, wherein the acquisition unit is implemented by one or more processors of the information processing apparatus;
a selection unit that selects a type of a registered image to be used for matching from one of the two-dimensional registered images and the three-dimensional registered images based on the two-dimensional image, prior to the matching the two-dimensional image with the registered image group, wherein the selection unit is implemented by the one or more processors;
a display information generation unit that extracts a plurality of candidates from the plurality of registrants and generates display information used for displaying the extracted candidates in order in accordance with the similarity degree based on the similarity degree obtained by matching the two-dimensional image of the matching target with a registered image group, wherein the display information generation unit is implemented by the one or more processors; and
a composite image generation unit that superimposes the three-dimensional registered image of a person selected from a plurality of candidates by a user operation on the two-dimensional image and generates a composite image, wherein the composite image generation unit is implemented by the one or more processors,
wherein the composite image generation unit generates the composite image by combining a portion of the three-dimensional registered image divided into a plurality of parts and a portion of the two-dimensional image divided into a plurality of parts.

2. The information processing apparatus according to claim 1, wherein the selection unit selects the type of the registered image based on the face orientation of the person in the two-dimensional image.

3. The information processing apparatus according to claim 2, wherein the selection unit selects the two-dimensional registered image when the angle formed by the face orientation of the person and the reference direction in the two-dimensional image is within a predetermined threshold value, and selects the three-dimensional registered image when the angle exceeds the threshold value.

4. The information processing apparatus according to claim 2 further comprising a matching unit that matches the two-dimensional image with the registered image group, wherein the matching unit is implemented by the one or more processors,
wherein the matching unit adjusts the face orientation of the registrant in the three-dimensional registered image to be consistent with the face orientation of a person in the two-dimensional image when the three-dimensional registered image is used for the matching.

5. The information processing apparatus according to claim 1, wherein the selection unit selects the type of the registered image based on the relationship between the person and the illumination light in the two-dimensional image.

6. The information processing apparatus according to claim 1, wherein the selection unit selects the type of the registered image based on an expression of the person in the two-dimensional image.

7. The information processing apparatus according to claim 1, wherein the selection unit selects the type of the registered image based on an elapsed period from the capturing date of the two-dimensional image.

8. The information processing apparatus according to claim 1, wherein the composite image generation unit performs an editing process for changing the appearance of the person or the registrant on at least one of the two-dimensional image, the three-dimensional registered image, and the composite image when generating the composite image.

9. An information processing method comprising:
acquiring a two-dimensional image of a person, and a registered image group including two-dimensional registered images and three-dimensional registered images of a plurality of registrants; and
selecting a type of a registered image to be used for matching from one of the two-dimensional registered images and the three-dimensional registered images based on the two-dimensional image, prior to the matching the two-dimensional image with the registered image group;
extracting a plurality of candidates from the plurality of registrants, and generating display information used for displaying the extracted candidates in order in accordance with the similarity degree based on the similarity degree obtained by matching the two-dimensional image of the matching target with a registered image group; and
superimposing the three-dimensional registered image of a person selected from a plurality of candidates by a user operation on the two-dimensional image, and generating a composite image,
wherein the composite image is generated by combining a portion of the three-dimensional registered image divided into a plurality of parts and a portion of the two-dimensional image divided into a plurality of parts.

10. An information processing apparatus comprising:

an acquisition unit that acquires a two-dimensional image of a person, and a registered image group including two-dimensional registered images and three-dimensional registered images of a plurality of registrants, wherein the acquisition unit is implemented by one or more processors of the information processing apparatus;

a selection unit that selects a type of a registered image to be used for matching from one of the two-dimensional registered images and the three-dimensional registered images based on the two-dimensional image, prior to the matching the two-dimensional image with the registered image group, wherein the selection unit is implemented by the one or more processors; and a composite image generation unit that superimposes the three-dimensional registered image of a person selected from a plurality of candidates by a user operation on the two-dimensional image and generates a composite image, wherein the composite image generation unit is implemented by the one or more processors, wherein the composite image generation unit performs an editing process of at least one of a body hair, an attachment, a body shape, a scar, and a change over the years on at least one of the two-dimensional image, the three-dimensional registered image, and the composite image when generating the composite image.

* * * * *